(12) United States Patent
Holdsworth

(10) Patent No.: US 9,982,183 B2
(45) Date of Patent: May 29, 2018

(54) PROCESS FOR TREATING AN UNDERGROUND FORMATION

(71) Applicant: Cleansorb Limited, Guildford, Surrey (GB)

(72) Inventor: Duncan Holdsworth, Guildford (GB)

(73) Assignee: Cleansorb Limited, Guildford, Surrey (GB)

( * ) Notice: Subject to any disclaimer, the term of this patent is extended or adjusted under 35 U.S.C. 154(b) by 75 days.

(21) Appl. No.: 14/354,625

(22) PCT Filed: Oct. 31, 2012

(86) PCT No.: PCT/GB2012/052712
§ 371 (c)(1),
(2) Date: Apr. 28, 2014

(87) PCT Pub. No.: WO2013/064823
PCT Pub. Date: May 10, 2013

(65) Prior Publication Data
US 2014/0303049 A1    Oct. 9, 2014

(30) Foreign Application Priority Data

Oct. 31, 2011 (GB) .................................. 1118838.0

(51) Int. Cl.
| | | |
|---|---|---|
| C09K 8/575 | (2006.01) | |
| E21B 33/138 | (2006.01) | |
| C09K 8/56 | (2006.01) | |
| E02D 37/00 | (2006.01) | |
| E04G 23/02 | (2006.01) | |
| E21B 21/00 | (2006.01) | |

(52) U.S. Cl.
CPC ............. *C09K 8/575* (2013.01); *C09K 8/56* (2013.01); *E02D 37/00* (2013.01); *E04G 23/0203* (2013.01); *E21B 21/003* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 1,994,050 A | | 3/1935 | Satow |
| 2,321,138 A | * | 6/1943 | Grebe .................. C09K 8/5045 166/130 |
| 2,717,875 A | | 9/1955 | Weiss et al. |
| 3,741,308 A | | 6/1973 | Veley |
| 4,357,248 A | | 11/1982 | Berkshire et al. |
| 4,439,328 A | | 3/1984 | Moity |
| 4,976,315 A | | 12/1990 | Prokop et al. |
| 5,209,296 A | | 5/1993 | Donlon et al. |
| 5,222,556 A | | 6/1993 | Donlon et al. |
| 5,225,593 A | | 7/1993 | Imanari et al. |
| 6,401,819 B1 | * | 6/2002 | Harris .................... C09K 8/506 166/270 |
| 6,513,592 B2 | | 2/2003 | Espin et al. |
| 6,702,044 B2 | | 3/2004 | Reddy et al. |
| 2008/0176770 A1 | | 7/2008 | Sanders et al. |

FOREIGN PATENT DOCUMENTS

| | | |
|---|---|---|
| EP | 0 644 257 A2 | 3/1995 |
| FR | 1465432 | 12/1966 |
| GB | 2 435 169 B | 4/2009 |
| WO | WO 99/05394 | 2/1999 |
| WO | WO 2005/124097 A1 | 12/2005 |
| WO | WO 2006/038016 A1 | 4/2006 |
| WO | WO 2008/037973 A1 | 4/2008 |

OTHER PUBLICATIONS

Hanson, R.W., "Decarboxylation of α-Keto Acids", *Journal of Chemical Education*, 64(7): 591-595 (Jul. 1987).
Huntsman Brochure of Jeffsol Alkylene Carbonates (2001).
Chapter 21: Decarboxylation: http://www.mhhc.com/physsci/chemistry/carcy5c/Ch2/ch21-4-2.html (Feb. 1, 2001).
International Search Report, International Application No. PCT/GB2012/052712, Entitled: "Process for Treating an Underground Formation," dated Apr. 18, 2013.
UK Search Report, Application No. GB1118838.0, dated Feb. 27, 2012.
Fox, S., et al., "Coordination of Biologically Important α-Amino Acids to Calcium(II) at High pH: Insights from Crystal Structures of Calcium α-Aminocarboxylates," *Inorganic Chemistry* 46(3):818-824 (2007).
Manoli, F., et al., "The Effect of Aminoacids on the Crystal Growth of Calcium Carbonate," *Journal of Crystal Growth* 236:363-370 (2002).
Rodriguez-Navarro, "Conservation of Ornamental Stone by Myxococcus xanthus-Induced Carbonate Biomineralization," *Applied and Environmental Microbiology* 69(4):2182-2193 (2003).
International Preliminary Report on Patentability with Written Opinion of the International Searching Authority for International Application No. PCT/GB2012/052712, Entitled: "Process for Treating an Underground Formation," dated May 6, 2014.
Huntsman; JEFFSOL® Alkylene Carbonates; Synthesis of Hydroxyalkyl Urethanes; Copyright © 2005.
Kihara, N., et al., "Polycondensation of ωHydroxy Carboxylic Acid Derived from L-Phenylalanine and Ethylene Carbonate", *J. Polym. Sci. Part A: Polym. Chem.*, 34 (1996) 1819-1822.

* cited by examiner

*Primary Examiner* — Jeffrey Washville
(74) *Attorney, Agent, or Firm* — Hamilton, Brook, Smith & Reynolds, P.C.

(57) ABSTRACT

The present invention relates to processes for consolidating an underground formation with a consolidating mineral. The consolidating material is a carbonate and is produced from an alkaline treatment fluid containing, in at least some embodiments, environmentally friendly and inexpensive components. In one embodiment, the process can be applied to consolidation of an underground formation during or following drilling. The present invention also provides a treatment fluid suitable for use in such processes.

21 Claims, No Drawings

PROCESS FOR TREATING AN UNDERGROUND FORMATION

This application is the U.S. National Stage of International Application No. PCT/GB2012/052712, filed Oct. 31, 2012, which designates the U.S., published in English, and claims priority under 35 U.S.C. §§ 119 or 365(c) to Great Britain Application No. 1118838.0, filed Oct. 31, 2011.

FIELD OF THE INVENTION

The present invention relates to the consolidation of underground formations through the deposition of a carbonate mineral from a treatment fluid as well as other situations where deposition of carbonate mineral from a treatment fluid may be desirable.

BACKGROUND TO THE INVENTION

A large proportion of hydrocarbon production worldwide is from underground sandstone formations. These formations often have a high porosity and permeability so have the potential to produce hydrocarbons at high rates. Frequently however, such formations have a tendency to produce sand, due to being unconsolidated or poorly consolidated. Sand producing formations generally are relatively young in the sense of geological time and are often composed of loosely attached sand or sediments that have not yet been converted to solid sandstone by geochemical processes.

Sand as used herein refers to fine particulate materials that may be produced from poorly consolidated sandstones. Normally these will be sand grains.

Poorly consolidated sandstones have been defined in U.S. Pat. No. 3,741,308 (cited herein only for the purpose of illustration and not for limiting the scope of the present invention) as follows: any assemblage of particulate matter provided: 1. Particles in the 50 to 2000 micron size range account for at least 10 percent of the weight of the entire assemblage. 2. At least about 20 percent by weight of the entire assemblage consists of minerals or compounds containing the element silicon as part of their chemical composition, and 3. The assemblage is either unconsolidated or so poorly consolidated that it behaves as an unconsolidated particulate system under stresses to which it is exposed.

Factors that can cause sand production in weak formations include producing drawdown, pressure depletion, in situ rock stresses, changes in flow rate or changes in water cut (sand production is often associated with water breakthrough). While a certain amount of sand production can be tolerated, excessive sand production can cause a variety of operational problems including erosion of pumps, tubing, chokes, valves and pipe bends. This can lead to serious safety and environmental consequences (U.S. Pat. No. 3,741,308). It can also lead to collapse of formation or casing and significant reduction in or loss of production.

The tendency of the formation to produce sand is indicated by the unconfined compressive strength of the formation. As a general guide, if a formation has an unconfined compressive strength of about $7.6 \times 10^6$ Pa (1,100 p.s.i.) or greater, sand production is unlikely, so sand control measures are not likely to be required. At an unconfined compressive strength of between about $2.8 \times 10^6$ Pa and $7.6 \times 10^6$ Pa (400 and 1,100 p.s.i.) sand production may occur and sand control is normally desirable. Below an unconfined compressive strength of about $2.8 \times 10^6$ Pa (400 p.s.i.) sand control is almost certainly required.

There have been a number of approaches to sand control. These include mechanical approaches that physically prevent sand from entering the produced fluids and the use of chemical methods that bind the sand grains together.

Common approaches to mechanical sand control include gravel packing and the use of screens including pre-packed screens. Gravel packs use gravel (sized sand) placed in the wellbore and physically prevent sand from entering the production stream. A screen is used to prevent gravel production. Gravel packs may be open hole (external gravel pack) or cased hole (internal gravel pack). "Frac-packs" combine cased hole gravel pack and hydraulic fracturing completions and are generally expected to give higher productivity than straight gravel packing. Pre-packed screens are commonly used in horizontal openhole wells and typically consist of a layer of resin-bonded gravel held between two screens. Other types of screen and expandable screens may also be used for mechanical sand control.

Chemical sand control is based on the introduction into the formation of chemicals that bind the sand together. The chemicals increase the strength of the attachments between the sand grains and therefore the tendency for sand production is reduced.

The principle disadvantages of current mechanical approaches to sand control are the cost and the fact that the sand control barrier creates an additional pressure barrier that can reduce the productivity of the well to considerably below its potential. The principle disadvantages of existing chemical approaches to sand control are the cost and health and safety and environmental considerations relating to the types of chemicals that are currently used, which are generally resins such as phenolic resins, furan, furfuryl alcohol and epoxy resins. Resins are often flammable, toxic or hazardous to handle. In addition, the difficulty of treating sections of wellbore which are more than several meters in length make current chemical approaches based on resins generally unsuitable for use in long wellbores. If too much resin is deposited, the formation may be sealed off and not just consolidated. Remedial treatments in a case where too much resin has been deposited are unlikely to be successful.

The use of enzymes in processes to deposit resins or minerals in underground formations has been taught in PCT/GB98/02117. Deposition of resins or minerals in the formation can result in consolidation. Consolidation using an alkali metal silicate in combination with urea or formamide has been taught in U.S. Pat. Nos. 5,209,296 and 5,222,556. Methods for consolidation based on the use of alkaline solutions in very hot wells have also been taught.

A more recent approach has been to use nanoparticles as a means to deliver consolidating materials into the formation (U.S. Pat. No. 6,513,592). Also, consolidation of a formation using resins while drilling has been taught (U.S. Pat. No. 6,702,044). Current mechanical and chemical approaches to sand control are essentially applied after the well is drilled. GB 2435169 teaches that minerals may be deposited in underground formations through the in-situ generation of phosphate, sulphate or other species in the presence of a metal salt. WO 2006/038016 teaches carbonate mineral deposition processes based on the use of bicarbonates or urea plus a metal salt in the treatment fluid.

There is a need for further processes for chemical consolidation of a formation that can achieve effective sand control through consolidation of the formation, while allowing good production or injection rates to be achieved and which are also low cost, low hazard, easy to apply and may be used on long formation intervals. Particularly desirable would be a methodology that makes use of simple, cheap and environmentally friendly components, is easy to prepare and carry out, and which operates over a desirable temperature range such that even consolidation (i.e. uniform consolidation) can be achieved throughout the target formation. There is also a need for processes for shutting off of a formation to production or injection which are effective, low cost, low hazard, easy to apply and may be used on long formation intervals. There is a further need for effective, low cost, low hazard, easy to apply processes for water or gas shut off, for the grouting of tunnels, or for other consolidation applications.

SUMMARY OF THE INVENTION

An object of the present invention is to provide further non-resin, chemical processes for consolidation of a formation and for sand control. Another object of the present invention is to provide further non-resin, chemical processes for formation shut-off. Yet another object of the present invention is to provide novel, non-resin chemical treatment processes whereby long formation intervals, for example horizontal openhole wells, can be consolidated in a simple treatment. A further object of the present invention is to provide chemical processes of consolidation which use chemicals that are low hazard and low toxicity and have low environmental impact.

Accordingly, the present invention provides a process for consolidating an underground formation, which process comprises: (a) introducing a treatment fluid into an underground formation, which treatment fluid comprises (I) cations of a metal having an oxidation state of +2 or higher and at least one of the following (II) to (VII) which is soluble in the treatment fluid: (II) an amino acid having at least one deprotonated carboxylic acid group; (III) (a) ammonia or an amine; and (b) at least one of (i) an alpha oxocarboxylic acid that contains a functional group of the formula —C(=O)—C(=O)—O⁻, (ii) an alkylene carbonate and (iii) a beta oxocarboxylic acid ester; (IV) an amino alkyl sulphonic acid having at least one deprotonated sulphonic acid group; (V) an alpha ketocarboxylic acid that contains a functional group of the formula —C(=O)—C(=O)—O⁻; (VI) a beta oxocarboxylic acid ester; and (VII) an alkylene carbonate; and which treatment fluid is alkaline or becomes alkaline in situ; and (b) allowing carbonate mineral to be deposited from the fluid, thereby consolidating the underground formation.

The present invention also provides the use of a treatment fluid for consolidating an underground formation with a consolidating material, which treatment fluid comprises (I) cations of a metal having an oxidation state of +2 or higher and at least one of the following (II) to (VII) which is soluble in the treatment fluid: (II) an amino acid having at least one deprotonated carboxylic acid group; (III) (a) ammonia or an amine; and (b) at least one of (i) an alpha oxocarboxylic acid that contains a functional group of the formula —C(=O)—C(=O)—O⁻, (ii) an alkylene carbonate and (iii) a beta oxocarboxylic acid ester; (IV) an amino alkyl sulphonic acid having at least one deprotonated sulphonic acid group; (V) an alpha ketocarboxylic acid that contains a functional group of the formula —C(=O)—C(=O)—O⁻; (VI) a beta oxocarboxylic acid ester; and (VII) an alkylene carbonate; and which treatment fluid is alkaline or is capable of becoming alkaline in situ.

Still further, the present invention provides a treatment fluid, which treatment fluid comprises (I) cations of a metal having an oxidation state of +2 or higher and at least one of the following (II) to (VII) which is soluble in the treatment fluid: (II) an amino acid having at least one deprotonated carboxylic acid group; (III) (a) ammonia or an amine; and (b) at least one of (i) an alpha oxocarboxylic acid that contains a functional group of the formula —C(=O)—C(=O)—O⁻, (ii) an alkylene carbonate and (iii) a beta oxocarboxylic acid ester; (IV) an amino alkyl sulphonic acid having at least one deprotonated sulphonic acid group; (V) an alpha ketocarboxylic acid that contains a functional group of the formula —C(=O)—C(=O)—O⁻; (VI) a beta oxocarboxylic acid ester; and (VII) an alkylene carbonate; and which treatment fluid is alkaline or is capable of becoming alkaline in situ in an underground formation.

In addition, the present invention provides a process for depositing carbonate material from a fluid, which process comprises: (a) providing a fluid comprising (I) cations of a metal having an oxidation state of +2 or higher and at least one of the following (II) to (VII) which is soluble in the treatment fluid: (II) an amino acid having at least one deprotonated carboxylic acid group; (III) (a) ammonia or an amine; and (b) at least one of (i) an alpha oxocarboxylic acid that contains a functional group of the formula —C(=O)—C(=O)—O⁻, (ii) an alkylene carbonate and (iii) a beta oxocarboxylic acid ester; (IV) an amino alkyl sulphonic acid having at least one deprotonated sulphonic acid group; (V) an alpha ketocarboxylic acid that contains a functional group of the formula —C(=O)—C(=O)—O⁻; (VI) a beta oxocarboxylic acid ester; and (VII) an alkylene carbonate; and which treatment fluid is alkaline or is capable of becoming alkaline; and (b) allowing carbonate mineral to be deposited from said fluid, if necessary after said fluid has become alkaline.

DETAILED DESCRIPTION OF THE INVENTION

The process of the present invention may be used to consolidate underground formations, including those from which hydrocarbons (oil or gas) or water are extracted or injected. The carbonate mineral that is deposited acts as a consolidant in the underground formation.

Cations of a metal (herein also referred to as "metal cations") suitable for use in the process of the present invention are those with an oxidation state of +2 or higher. Suitable metals include group II metals and transition metals, including magnesium, calcium, strontium, barium, titanium, vanadium, chromium, manganese, iron, cobalt, nickel, copper, zinc, aluminium silver or zirconium. Magnesium and calcium are particularly preferred. Calcium is most preferred.

The cations of a metal may be present in the form of a salt of metal cations. For example, the metal cations may conveniently be provided in the form of any water soluble salts compatible with the other components of the treatment fluid, including, but not being limited to, chlorides, bromides, nitrates, propionates, lactates, acetates and formates. Alternatively, though, the metal cations may be present in any complex or coordination compound provided that the consolidation process is still able to proceed.

References throughout this specification to the metal cations being provided "in the form of" a particular salt of course mean that the salt has been incorporated into the treatment fluid, e.g. to thereby produce dissociated metal cations and counterion anions, rather than implying that the cations and anions remain physically bound to one another within the treatment fluid.

The consolidation systems of the present invention are based on the deposition of carbonate materials from the metal cations (I) and at least one of the components/ component combinations (II) to (VII). Each or every component in (II) to (VII) is typically soluble in the treatment fluid.

In one embodiment, at least one of the components (II), (III)(a), (III)(b)(i), (IV) or (V) is present and is generated in-situ in the treatment fluid from another substance. In other words, these components may be provided as such in the treatment fluid or alternatively another substance may initially be mixed into the treatment fluid, which then transforms (e.g. chemically degrades) in situ to produce the relevant component.

As is very well known in the art, an amino acid is a compound that comprises at least one amine functional group and at least one carboxylic acid functional group (i.e., a group of formula —$CO_2H$). Thus, an amino acid having at least one deprotonated carboxylic acid group means an amino acid that comprises at least one amine functional group and at least one carboxylate functional group (i.e., a group of formula —$COO^-$). It has been found that deprotonation of at least one of the carboxylic acid groups present in an amino acid is needed for consolidation processes based on amino acids to proceed. The amino acid (II) having at least one deprotonated carboxylic acid may alternatively and interchangeably be referred to as a "deprotonated amino acid" or as an "amino acid salt". The amino acid may be naturally occurring, synthetic, proteogenic, or nonproteogenic.

If an amino acid (II) is used that contains multiple carboxylic acid functional groups, then the amino acid having at least one deprotonated carboxylic acid group can be, and typically is, an amino acid on which all of the carboxylic acid groups are deprotonated.

The amino acid (II) having at least one deprotonated carboxylic acid group can be any such compound that is capable of generating a carbonate material in conjunction with the metal cations in a treatment fluid.

There is no particular limitation on the chemical structure of the amino acid (II) having at least one deprotonated carboxylic acid group, beyond of course that it must have at least one amine functional group (typically a primary or secondary amine functional group) and at least one carboxylate functional group. For example, other functional groups can be present provided that they do not prevent deposition of carbonate material when the compound is present in a treatment fluid. A person of ordinary skill in the art would have no difficulty in selecting suitable amino acids for use in the present invention. Furthermore, straightforward and routine field and/or laboratory tests could, if desired, be used to confirm whether a particular amino acid is suitable for use in the present invention.

Some suitable amino acids (II) having at least one deprotonated carboxylic acid group are those derived from α-amino acids, β-amino acids and γ-amino acids. Particularly preferred are amino acids having at least one deprotonated carboxylic acid group that are derived from α-amino acids and β-amino acids, most preferably α-amino acids. The amine group may be a secondary amine or a primary amine. In an embodiment, the amine group is a primary amine group.

As is well known, many amino acids have chiral centres. It is not important for the purposes of the invention whether the amino acid having at least one deprotonated carboxylic acid group is chiral or achiral, or whether it is present in a particular enantiomeric form. If a particular amino acid is commercially available at lower cost in a particular chiral form, it is sometimes preferable to use that lower cost form. Nonetheless, the process of the present invention can be carried out using amino acids having at least one deprotonated carboxylic acid group in any optically active or non-optically active form whatsoever.

Examples of an amino acid (II) having at least one deprotonated carboxylic acid group are the carboxylic-acid-deprotonated forms of alanine, arginine, asparagine, aspartic acid, cysteine, glutamine, glutamic acid, glycine, histidine, isoleucine, leucine, lysine, methionine, phenylalanine, proline, serine, threonine, tyrosine, valine, sarcosine, iminodiacetic acid, 3-aminobutyic acid, GABA (γ-aminobutyric acid), ornithine and β-alanine.

If the amino acid contains a secondary amine group which is protonated such as with lysine monohydrochloride and L-arginine monohydrochloride, this group also needs to be deprotonated.

Preferred amino acids (II) having at least one deprotonated carboxylic acid group are the carboxylic-acid-deprotonated forms of glycine (otherwise known as "glycinate"), histidine, β-alanine, alanine, serine, glutamic acid (otherwise known as "glutamate") aspartic acid, threonine, sarcosine, lysine, methionine, arginine, valine, iminodiacetic acid, 3-aminobutyric acid or γ-aminobutyric acid. For example, suitable amino acids having at least one deprotonated carboxylic acid group are the carboxylic-acid-deprotonated forms of glycine and glutamic acid, i.e. glycinate and glutamate. The most preferred amino acids (II) are deprotonated forms of glycine, glutamic acid, sarcosine (n-methylglycine) or lysine.

Typically said amino acid (II) having at least one deprotonated carboxylic acid group does not contain a terminal amide group.

When used in combination with cations of a metal with an oxidation state of +2 or higher, the amino acids having at least one deprotonated carboxylic acid group have been found to be highly effective in processes for depositing a carbonate mineral.

The inventor has found that the consolidation processes of the present invention proceeds effectively under alkaline conditions. Typically therefore the pH of the treatment fluid when in place in the underground formation is greater than 7. In an embodiment, the pH is greater than or equal to 8, for example greater than or equal to 9. Further suitable pHs are those greater than or equal to 10, for example greater than or equal to 10.5. These preferred pH conditions apply for all systems of the present invention (i.e., they are not limited to amino-acid-based (II) systems). The preferred upper pH will of course vary according to the specific system and could be readily determined by one of ordinary skill in the art. For example, one of ordinary skill in the art would typically use a pH that does not result in the deposition of precipitates other than carbonate salts (such as precipitates that could be formed at very high pHs between the cations (I) and an enolate species formed via deprotonation of a beta oxocarboxylic acid ester component (III)(b)(iii) or (VI)).

With reference to amino-acid-based systems, the pH of the treatment fluid in situ is such that there is enough amino acid having at least one deprotonated carboxylic acid group present in the fluid to achieve effective consolidation. A suitable pH for a particular treatment fluid containing particular components can be readily determined by the skilled person through routine experimentation, if need be.

An appropriate pH can be achieved by ensuring that the treatment fluid is alkaline before it is placed in the formation. For instance, this may be achieved by addition of a suitable quantity of base, for example an alkali metal hydroxide. Suitable alkali metal hydroxides include sodium hydroxide and potassium hydroxide.

The treatment fluid may alternatively become alkaline in situ. For example, the treatment fluid may contain a component that hydrolyses or decomposes over time to generate a base in situ. It has previously been taught that compounds able to generate a base include the following: amides including formamide, acetamide. urea and urea derivatives (e.g. 1-methylurea, 1,1-dimethylurea, 1,3-dimethylurea, 1,1,3-trimethylurea, 1-ethylurea, 1,1-diethylurea, 1,3-diethylurea, n-propylurea, n-butylurea, 1-phenylurea, 1-methyl-3-phenylurea, 1-ethyl-1-phenylurea) organic azides, cyanic acid, cyanic acid amines (e.g. hexamethyltetraamine, hexamethylenetetramine), tetraazatricycloalkanes and acyl azides (e.g. acetyl azide, propionyl azide, malonyl azide, succinyl azide, phthaloyl azide). Preferred are hexamethyltetraamine, hexamethylenetetramine formamide and urea; most preferred is urea. As explained already, the pH of the treatment fluid in situ must be such that there is enough amino acid having at least one deprotonated carboxylic acid group present in the fluid to achieve effective consolidation. Suitable bases are those capable of deprotonating an amino acid compound to produce an amino acid having at least one deprotonated carboxylic acid group.

Typically the consolidation process proceeds in the presence of hydroxide ions. Thus, in the context of the requirement that the treatment fluid is alkaline or becomes alkaline in situ, it is preferable that the treatment fluid thereby contains hydroxide ions. It will be appreciated that hydroxide ions will necessarily be present when the treatment fluid comprises water and it is or becomes alkaline in situ.

For the avoidance of doubt, references throughout this specification to "in situ" mean in the underground formation and in particular in the part of the underground formation where consolidation is to be effected. Alternatively, where the consolidation processes are being effected in situations other than in underground formations, then in situ refers, by analogy, to the particular location where deposition of carbonate material is desired.

The deposition of the metal carbonate from the treatment fluids of the present invention may be considered to be precipitation from homogeneous solution. Thus, references herein to "depositing" or "deposited" are interchangeable with "precipitating" or "precipitated".

For systems based on the use of an amino acid (II) the amino acid having at least one deprotonated carboxylic acid group may be provided by adding a carboxylate salt directly to the treatment fluid. For example a suitable glycinate salt may be sodium glycinate. References throughout this specification to an amino acid having at least one deprotonated carboxylic acid group being provided "in the form of" a particular salt of course means that the salt has been incorporated into the treatment fluid, e.g. to thereby produce dissociated carboxylate groups and counterion cations, rather than implying that the amino acid having at least one deprotonated carboxylic acid group and its counterion cations remain physically bound to one another within the treatment fluid.

Alternatively the amino acid having at least one deprotonated carboxylic acid group may be produced within the treatment fluid by mixing an amino acid and an amount of a suitable strong base at least equimolar to the amino acid. For example, glycine, histidine, β-alanine, alanine or serine may be mixed with at least an equimolar amount of a suitable strong base. Glutamic acid and aspartic acid, which contain two carboxylic acid groups, may be mixed with at least two molar equivalents of a suitable strong base (i.e., an equimolar amount of base with respect to the total mole number of carboxylic acid groups). A suitable strong base is one capable of deprotonating the carboxylic acid groups present in the amino acid. Typically, an excess of no more than 20 mol % and preferably no more than 10 mol % of base is added with respect to the total mole number of carboxylic acid groups in the amino acid, in order to avoid precipitation of metal hydroxide from the treatment fluid. More preferably, an excess of no more than 7.5 mol %, for example no more than 5 mol %, of base is added with respect to the total mole number of carboxylic acid groups in the amino acid.

Particularly preferred treatment fluids of the present invention include aqueous fluids containing calcium chloride plus either sodium glycinate, sodium glutamate, sodium sarcosinate, or the sodium salt of lysine. Thus, the treatment fluid may comprise (I) calcium chloride and (II) glycine, glutamic acid, sarcosine or lysine.

When generating sodium glycinate within the treatment fluid, preparing this from a mixture of glycine plus sodium hydroxide is most preferred. When generating sodium glutamate within the treatment fluid, preparing this from a mixture of glutamic acid plus sodium hydroxide is most preferred. Sodium hydroxide is also most preferred for preparing sodium sarcosinate and the sodium salt of lysine.

It will be understood by those skilled in the art that in some embodiments of the present invention, the amino acid or amino acid having at least one deprotonated carboxylic acid group may be generated in situ from suitable precursors. Such precursors will be readily determined by those skilled in the art and include, but are not limited to, di-, tri-, tetra- or polypeptides, including diglycine, triglycine, tetraglycine and polyglycine, polyaspartic acid, oligopeptides, cyclic dipeptides (such as 2,5-diketopiperazine "glycine anhydride"), cyclic oligo peptides or esters or amides of amino acids. Also included are proteins rich in suitable amino acids, for example collagen, which is rich in glycine.

In addition to the use of deprotonated amino acids (II) in processes for depositing carbonate minerals, as described herein, other chemical systems have been determined to be effective for depositing carbonate minerals in the presence of (I) cations of a metal having an oxidation state of +2 or higher.

These other chemical systems for depositing carbonate mineral are based on (I) in combination with any of: (III) (a) ammonia or an amine; and (b) at least one of (i) an alpha oxocarboxylic acid that contains a functional group of the formula —C(=O)—C(=O)—O$^-$, (ii) an alkylene carbonate and (iii) a beta oxocarboxylic acid ester; (IV) an amino alkyl sulphonic acid having at least one deprotonated sulphonic acid group; (V) an alpha ketocarboxylic acid that contains a functional group of the formula —C(=O)—C(=O)—O$^-$; (VI) a beta oxocarboxylic acid ester; and (VII) an alkylene carbonate.

In the case of processes based on (III), either of, or both of, an amine and ammonia are present. The amine is typically a primary or secondary amine that does not contain any terminal amide functional groups. For the avoidance of doubt, "amine" means a compound (e.g., an alkyl or aryl compound) containing an amine functional group (an amine functional group not being part of an amide group). The primary or secondary amine may, for example, be selected from monoethanolamine (MEA), diethanolamine (DEA) diethylenetriamine (DETA), triethylenetetramine (TETA), N-methylethanolamine, 2-amino-2-(hydroxymethyl)-1,3-propanediol (Tris), bis(2-hydroxypropyl)amine, 2-amino-2-methyl-1,3-propanediol, and polyethyleneimine (PEI). The amine (III) may be provided in the form of a salt, which salt releases the amine under alkaline conditions. Preferably said salt is ethanolamine hydrochloride, Tris-hydrochloride or diethanolamine hydrochloride.

The ammonia may be provided as such, or alternatively, and preferably, may be generated in-situ by any means known to those skilled in the art, preferably from the thermal hydrolysis of urea or from the action of urease enzyme on urea. Provision of ammonia generated in-situ may be advantageous in view of avoiding, or mitigating the extent of, calcium hydroxide precipitation.

In the case of processes based on (III), the amine and/or ammonia is provided in combination with at least one of: (i) an alpha oxocarboxylic acid that contains a functional group of the formula —C(=O)—C(=O)—O$^-$; (ii) an alkylene carbonate; and (iii) a beta oxocarboxylic acid ester.

There is no particular limitation on the chemical structure of the alpha oxocarboxylic acid, beyond of course that it must have at least one functional group of the formula —C(=O)—C(=O)—O$^-$ (i.e., where the carbonyl group is situated on the alpha carbon with respect to the deprotonated carboxylic acid group). For example, other functional groups can be present provided that they do not prevent deposition of carbonate material when the alpha oxocarboxylic acid is present in a treatment fluid. A person of ordinary skill in the art would have no difficulty in selecting suitable alpha oxocarboxylic acids for use in the present invention. Furthermore, straightforward and routine field and/or laboratory tests could, if desired, be used to confirm whether a particular alpha oxocarboxylic acid is suitable for use in the present invention.

The alpha oxocarboxylic acid may, for example, have the formula (Y)

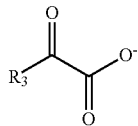

(Y)

wherein $R_3$ is selected from hydrogen, $C_{1-6}$ alkyl, a hydrocarbyl ring containing 3 to 6 carbon atoms, a $C_{6-10}$ aryl ring, a 5- to 10-membered heteroaryl ring and a 5- to 10-membered heterocyclyl ring. Examples of particularly suitable alpha oxocarboxylic acids include glyoxylic acid, pyruvic acid and 2-ketobutyric acid.

In general, an alpha oxocarboxylic acid includes alpha ketocarboxylic acids (where a ketone group is at the alpha position to the carboxylic acid) and alpha aldocarboxylic acids (where an aldehyde group is at the alpha position to the carboxylic acid).

There is also no particular limitation on the chemical structure of the alkylene carbonate, beyond of course that contain an alkylene carbonate functional group (otherwise known as an 1,3-dioxolan-2-one group). Thus, "alkylene carbonate" can be used interchangeably with "1,3-dioxolan-2-one compound". Other functional groups can be present provided that they do not prevent deposition of carbonate material when the alkylene carbonate is present in a treatment fluid. A person of ordinary skill in the art would have no difficulty in selecting suitable alkylene carbonates for use in the present invention. Furthermore, straightforward and routine field and/or laboratory tests could, if desired, be used to confirm whether a particular alkylene carbonate is suitable for use in the present invention. Examples of suitable alkylene carbonates include ethylene carbonate, propylene carbonate, butylene carbonate or glycerine carbonate.

Similarly, there is no particular limitation on the chemical structure of the beta oxocarboxylic acid ester, beyond of course that it contains an beta oxocarboxylic acid ester functional group (i.e., a carbonyl group located in the beta position with respect to the carboxylic acid group). Other functional groups can be present provided that they do not prevent deposition of carbonate material when the beta oxocarboxylic acid ester is present in a treatment fluid. A person of ordinary skill in the art would have no difficulty in selecting suitable beta oxocarboxylic acid esters for use in the present invention. Furthermore, straightforward and routine field and/or laboratory tests could, if desired, be used to confirm whether a particular beta oxocarboxylic acid ester is suitable for use in the present invention. The beta oxocarboxylic acid ester may, for example, have a formula $R_a$—C(=O)—CH$_2$—C(=O)—O—$R_b$, where $R_a$ is selected from hydrogen, $C_{1-6}$ alkyl, a hydrocarbyl ring containing 3 to 6 carbon atoms, a $C_{6-10}$ aryl ring, a 5- to 10-membered heteroaryl ring and a 5- to 10-membered heterocyclyl ring and $R_b$ is selected from $C_{1-6}$ alkyl, a hydrocarbyl ring containing 3 to 6 carbon atoms, a $C_{6-10}$ aryl ring, a 5- to 10-membered heteroaryl ring and a 5- to 10-membered heterocyclyl ring. Exemplary beta oxocarboxylic acid esters are ethyl acetoacetate and methyl acetoacetate.

In the case of processes based on (IV), an amino alkyl sulphonic acid having at least one deprotonated sulphonic acid group means a compound that contains both an aminoalkyl group and a deprotonated sulphonic acid group (—SO$_3^-$). There is no particular limitation on the chemical structure of this component other than it must contain these functional groups. Other functional groups can be present provided that they do not prevent deposition of carbonate material when this component is present in a treatment fluid. A person of ordinary skill in the art would have no difficulty in selecting suitable amino alkyl sulphonic acids for use in the present invention. Furthermore, straightforward and routine field and/or laboratory tests could, if desired, be used to confirm whether a particular amino alkyl sulphonic acid is suitable for use in the present invention. For example, the amino alkyl sulphonic acid (IV) having at least one deprotonated sulphonic acid group may be a deprotonated form of 2-aminoethane sulphonic acid (commonly known as taurine).

For processes based on (V), the alpha ketocarboxylic acid is a compound that contains a functional group of the formula —C(=O)—C(=O)—O$^-$ and wherein the carbonyl group at the alpha-position to the carboxylate functional group is part of a ketone group (i.e., it is not an aldehyde functional group). Other functional groups may be present in the compound provided that they do not prevent deposition of carbonate material when this component is present in a treatment fluid.

The alpha ketocarboxylic acid may, for example, have the formula (X)

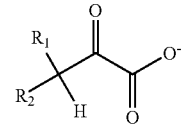

(X)

wherein $R_1$ and $R_2$ are independently selected from hydrogen, $C_{1-6}$ alkyl, a hydrocarbyl ring containing 3 to 6 carbon atoms, a $C_{6-10}$ aryl ring, a 5- to 10-membered heteroaryl ring and a 5- to 10-membered heterocyclyl ring, or wherein $R_1$ and $R_2$, together with the carbon atom to which they are mutually attached, form a hydrocarbyl ring containing 3 to 6 carbon atoms, a $C_{6-10}$ aryl ring, a 5- to 10-membered heteroaryl ring or a 5- to 10-membered heterocyclyl ring. Examples of particularly preferred alpha ketocarboxylic acids include pyruvic acid and 2-ketobutyric acid.

As used herein (for example in the formulae (X) and/or (Y) and/or with reference to the groups $R_a$ and $R_b$), a hydrocarbyl ring containing 3 to 6 carbon atoms includes cylopropyl, cyclobutyl, cyclopentyl and cyclohexyl, with cyclopentyl and cyclohexyl being preferred and cyclohexyl being particularly preferred.

As used herein (for example in the formulae (X) and/or (Y) and/or with reference to the groups $R_a$ and $R_b$), a $C_{6-10}$ aryl ring is a monocyclic or polycyclic 6- to 10-membered aromatic hydrocarbon ring system having from 6 to 10 carbon atoms. Phenyl is preferred.

As used herein (for example in the formulae (X) and/or (Y) and/or with reference to the groups $R_a$ and $R_b$), a 5- to 10-membered heteroaryl ring is a monocyclic or polycyclic 5- to 10-membered aromatic ring system, such as a 5- or 6-membered ring, containing at least one heteroatom, for example 1, 2, 3 or 4 heteroatoms, selected from O, S and N. When the ring contains 4 heteroatoms these are preferably all nitrogen atoms. Examples of monocyclic heteroaryl groups include thienyl, furyl, pyrrolyl, imidazolyl, thiazolyl, isothiazolyl, pyrazolyl, oxazolyl, isoxazolyl, triazolyl, thiadiazolyl, oxadiazolyl, pyridinyl, pyridazinyl, pyrimidinyl, pyrazinyl, triazinyl and tetrazolyl groups. Examples of polycyclic heteroaryl groups include benzothienyl, benzofuryl, benzimidazolyl, benzothiazolyl, benzisothiazolyl, benzoxazolyl, benzisoxazolyl, benztriazolyl, indolyl, isoindolyl and indazolyl groups. Preferred polycyclic groups include indolyl, isoindolyl, benzimidazolyl, indazolyl, benzofuryl, benzothienyl, benzoxazolyl, benzisoxazolyl, benzothiazolyl and benzisothiazolyl groups, more preferably benzimidazolyl, benzoxazolyl and benzothiazolyl, most preferably benzothiazolyl. However, monocyclic heteroaryl groups are preferred.

Preferably the heteroaryl group is a 5- to 6-membered heteroaryl group. Particularly preferred heteroaryl groups are thienyl, pyrrolyl, imidazolyl, thiazolyl, isothiazolyl, pyrazolyl, oxazolyl, isoxazolyl, triazolyl, pyridinyl, pyridazinyl, pyrimidinyl and pyrazinyl groups. More preferred groups are thienyl, pyridinyl, pyridazinyl, pyrimidinyl, pyrazinyl, pyrrolyl and triazinyl, most preferably pyridinyl.

As used herein (for example in the formulae (X) and/or (Y) and/or with reference to the groups $R_a$ and $R_b$), and a 5- to 10-membered heterocyclyl ring is a non-aromatic, saturated or unsaturated, monocyclic or polycyclic $C_{5-10}$ carbocyclic ring system in which one or more, for example 1, 2, 3 or 4, of the carbon atoms are replaced with a moiety selected from N, O, S, S(O) and $S(O)_2$. Preferably, the 5- to 10-membered heterocyclyl group is a 5- to 6-membered ring. Examples of heterocyclyl groups include azetidinyl, oxetanyl, thietanyl, pyrrolidinyl, imidazolidinyl, oxazolidinyl, isoxazolidinyl, thiazolidinyl, isothiazolidinyl, tetrahydrofuranyl, tetrahydrothienyl, tetrahydropyranyl, tetrahydrothiopyranyl, dithiolanyl, dioxolanyl, pyrazolidinyl, piperidinyl, piperazinyl, hexahydropyrimidinyl, methylenedioxyphenyl, ethylenedioxyphenyl, thiomorpholinyl, S-oxothiomorpholinyl, S,S-dioxo-thiomorpholinyl, morpholinyl, 1,3-dioxolanyl, 1,4-dioxolanyl, trioxolanyl, trithianyl, imidazolinyl, pyranyl, pyrazolinyl, thioxolanyl, thioxothiazolidinyl, 1H-pyrazol-5-(4H)-onyl, 1,3,4-thiadiazol-2(3H)-thionyl, oxopyrrolidinyl, oxothiazolidinyl, oxopyrazolidinyl, succinimido and maleimido groups and moieties. Preferred heterocyclyl groups are pyrrolidinyl, imidazolidinyl, oxazolidinyl, isoxazolidinyl, thiazolidinyl, isothiazolidinyl, tetrahydrofuranyl, tetrahydrothienyl, tetrahydropyranyl, tetrahydrothiopyranyl, dithiolanyl, dioxolanyl, pyrazolidinyl, piperidinyl, piperazinyl, hexahydropyrimidinyl, thiomorpholinyl and morpholinyl groups and moieties. More preferred heterocyclyl groups are tetrahydropyranyl, tetrahydrothiopyranyl, thiomorpholinyl, tetrahydrofuranyl, tetrahydrothienyl, piperidinyl, morpholinyl and pyrrolidinyl groups.

A beta oxocarboxylic acid ester or an alkylene carbonate can also be used without being combined with an amine in the system (III), i.e. as system (VI) or (VII), respectively. For processes based on (VI), preferred beta oxocarboxylic acid esters include those described elsewhere herein (for example, in the processes based on (III)); similarly, for processes based on (VII), preferred alkylene carbonates include those described elsewhere herein (for example, in the processes based on (III)).

In the case of processes based on (II) amino acids the further addition of (i) a hemiacetal or (ii) a hemiketal may be beneficial. The hemiacetal or hemiketal may be 1,3-dihydroxyacetone dimer or a reducing sugar comprising a monosaccharide, disaccharide, oligosaccharide or polysaccharide. 1,3-dihydroxyacetone dimer is a hemiacetal that reacts with sodium glycinate resulting in decarboxylation but is not a reducing sugar. The monosaccharide, disaccharide or oligosaccharide may be selected from glucose, fructose, galactose, xylose, ribose, arabinose, lyxose, allose, altrose, mannose, gulose, talose, lactulose, lactose, maltose, cellobiose or dextrin. Preferably the monosaccharide, disaccharide or oligosaccharide is glucose, fructose, dextrin or maltose. The reducing sugar can be produced in situ via the breakdown of a non-reducing di-, tri-, tetra-, oligo- or poly-saccharide using an enzyme or oxidising agent. The reducing sugars are assumed to exist primarily as rings in solution possessing either hemiketal and/or hemiacetal groups.

In the case of processes based on (II) amino acids or (IV) amino alkyl sulphonic acids, the further addition of a carbonyl compound is optional and may be beneficial. The optional carbonyl compound, if present, is typically also soluble in the treatment fluid.

Different carbonyl compounds may be effective with (II) amino acids or (IV) amino alkyl sulphonic acids.

In the case of processes based on (II) amino acids, the carbonyl compound may be selected from a $C_{1-20}$ aldehyde, a $C_{1-20}$ alpha carbonyl ketone, a $C_{1-20}$ alpha hydroxy ketone, an alpha-oxocarboxylic acid, a beta-oxocarboxylic acid ester, an alkylene carbonate or a D-isoascorbate salt (the latter also commonly known as an erythorbate salt). Examples of such carbonyl compounds include carbonyl compounds selected from glyoxylic acid monohydrate, glyoxylic acid 50% wt. aqueous solution, pyruvic acid, 2-ketobutyric acid (these preceding four preferably being deprotonated, e.g. using sodium hydroxide), 4-hydroxybenzaldehdye, phthaldialdehyde, methyl cyclopentenolone, methyl acetoacetate, ethyl acetoacetate, ethylene carbonate, propylene carbonate, butylene carbonate, glycerine carbonate, sodium D-isoascorbate monohydrate, pyruvaldehyde, 2,2-dimethoxyacetaldehyde and hydroxyacetone. An alpha hydroxyl ketone is also specifically known as an acyloin and generally as a ketol. The alpha carbonyl group of the alpha carbonyl ketone may be either an aldehyde (i.e. an alpha keto aldehyde) or a ketone (i.e. an alpha keto ketone also known as an alpha diketone.)

In the case of the amino alkyl sulphonic acids (IV), the carbonyl compound may be selected from an alpha-oxocarboxylic acid, a beta-oxocarboxylic acid ester or an alkylene carbonate. Preferably the carbonyl compound is glyoxylic acid monohydrate, glyoxylic acid 50% wt. aqueous solution, pyruvic acid, 2-ketobutyric acid, methyl acetoacetate, ethyl acetoacetate, ethylene carbonate, propylene carbonate, butylene carbonate or glycerine carbonate.

As with amino-acid based systems (II), it is also necessary for the carbonate deposition systems based on (III), (IV), (V), (VI) and (VII) to be run under alkaline conditions, where for example the alpha oxocarboxylic acid, alpha ketocarboxylic acid, amino alkyl sulphonic acid or amino acid will be in a deprotonated form. For example, in the process of the present invention at least one of the components (II), (III)(b)(i), (IV) and (V) may be present and be prepared by deprotonating the corresponding protonated form of the component with at least a stoichiometric equivalent of base. The base may, for example, be sodium hydroxide or potassium hydroxide.

It is desirable that individual chemicals are selected such they are soluble to a sufficient extent in the treatment fluid to allow their entry into a permeable medium such as the rock matrix, to allow the treatment fluid to effectively deposit carbonate mineral within the permeable medium in order to achieve the desired effect such as consolidation, water or gas shut off etc. For example some potential candidate compounds such as dicarboxylates may form insoluble complexes with (I) cations of a metal having an oxidation state of +2 or higher.

The currently most preferred treatment fluids comprise calcium ions as component (I) in combination with a component selected from lysine, glycine, sarcosine (i.e., amino acids belonging to the general group (II)) and taurine (i.e., an amino alkyl sulphonic acid belonging to the general group (IV)). Preferably these treatment fluids further comprise a base, thus ensuring the required deprotonation of the carboxylic acid groups in the amino acids or the sulphonic acid group in the amino alkyl sulphonic acid, respectively.

The concentrations of the components (I) and (II), (III), (IV), (V), (VI) and (VII) in the treatment fluid will be selected to give the required rate of carbonate deposition and amount of carbonate deposition and extent of consolidation or permeability reduction of the formation within the duration of the treatment.

Before field use, the suitability of individual candidate systems under conditions relevant to the formation to be treated (particularly temperature) can routinely be determined in tests carried out by one skilled in the art.

In all cases, the consolidating mineral deposited is a carbonate or substantially a carbonate. In some cases carbonate may be co-deposited with other poorly soluble materials produced during the carbonate deposition reactions. It will be understood that as long as at least some carbonate is deposited, leading to consolidation or water or gas shut off etc. that the treatment fluids will fall within the scope of the present invention.

In certain embodiments, such as those discussed below, the treatment fluid may contain components in addition to the components (I) and (II), (III), (IV), (V), (VI) or (VII). It will of course be appreciated that any additional components present in the treatment fluid must be compatible with the other components, in the sense that they must not prevent the desired consolidation process from taking place. A skilled person would generally be able easily to recognise whether particular additional components would be compatible with the treatment fluid of the invention. However, if necessary this could be routinely and easily confirmed by preparing a suitable test mixture containing the additional components at issue and then checking whether deposition of carbonate material still occurs in the required manner.

Following preparation of the treatment fluid and introduction of the treatment fluid into the underground formation, the treatment fluid will normally undergo an increase in temperature as it is heated by the formation. This will increase the rate of deposition of the carbonate mineral as a solid consolidating material. The consolidating material is preferably deposited on the internal surfaces of the formation, such as the surface of individual sand particles, and results in an increase in the strength of the formation. Similarly, deposition of the consolidating material may be used to strengthen proppant packs in propped fractures or gravel in gravel packs. All substances present in the treatment fluid will preferably be soluble in the treatment fluid to at least a concentration that will be useful in the process of the present invention (that is, a concentration that will result in a degree of deposition of consolidating material effective for consolidation).

In order to facilitate ready penetration into the formation to be consolidated, the treatment fluid will normally be particulate-free and have low viscosity. There may however be some cases where use of a particulate-containing treatment fluid or a higher viscosity treatment fluid might be beneficial to produce a desired consolidating material (for example, for seeding or nucleation purposes or where the process of the present invention is combined with the use of other consolidation processes requiring the use of particulates e.g. nanoparticle based consolidation processes). The use of particulate containing fluids, including in some embodiments the use of particulates large enough to block pore throats, is therefore not excluded from the scope of the present invention.

The treatment may be carried out at any suitable stage during completion or production or injection of the well. The treatment may be carried out on new wells or those that have been already been produced or injected.

The treatment fluid is normally prepared at the surface by mixing the components (I) and (II), (III), (IV), (V), (VI) or (VII) and any other optional components into a solvent such as water or brine by any method such as will be known to those skilled in the art. Water is usually used as the solvent, but the solvent could also be a water-miscible solvent or a mixture of water with one or more water-miscible solvents. In some cases the treatment fluid may be an emulsion or microemulsion including non-polar solvents or hydrocarbons and suitable emulsifying agents or surfactants.

Following preparation of the treatment fluid, it is placed in the formation using a suitable method such as will be known to those skilled in the art, for example pumping via a drillstring, by bullheading, or by coiled tubing. The well penetrating the formation may be cased and perforated or openhole. In the case of treating formations adjacent to an openhole well, including formations adjacent to a horizontal well, it may be necessary to remove any filter cake present at the formation face (particularly in the case of a newly drilled well) by any suitable method, such as will be known to those skilled in the art, before introducing the treatment fluid, so that the treatment fluid can enter the formation. In the case of treating formations adjacent to a cased and perforated wellbore it may be necessary to remove any damage in the vicinity of the perforations and adjacent formation by any suitable method such as will be known to those skilled in the art, before introducing the treatment fluid, so that the treatment fluid can enter the formation.

The fluid is placed sufficiently far into the formation to be treated to give an adequate degree of sand control. The degree of consolidation (formation strengthening) required and the depth to which consolidation is required will be readily determinable by one skilled in the art of designing such treatments.

Generally, the degree of strengthening obtained with the treatment fluid formulation to be used on the formation will be determined in a laboratory evaluation ahead of the treatment to assist in design of the treatment. The extent of consolidation may conveniently be investigated by measuring the unconfined compressive strength of the formation with and without treatment, for example using cores cut from the formation. The effectiveness of the process may also be assessed or estimated using model systems such as the consolidation of loose sand or glass beads or through core tests run on cores cut from poorly consolidated outcrop sandstones.

After placement of the treatment fluid in the formation, the fluid is left for a sufficient period of time for the deposition of consolidating material to occur. This will normally take a period of a day to a few weeks (for example from 1 to 28 days and preferably from 2 to 14 days), but may take place over a shorter or longer period of time depending on the specific formulation and temperature. In the case of those treatment fluids capable of depositing carbonate mineral at the fastest rates, deposition may be essentially complete within less than a day or even within a period of minutes or hours.

The temperature at which the treatment is carried out is generally an important determinant of the rate of the deposition reactions. Normally, consolidation will proceed at the prevailing temperature of the formation. The treatment fluid as introduced will normally (although not in all cases) be at a lower temperature than the formation and will increase in temperature with time. It is well known that the rate of chemical reactions generally increases at higher temperatures. The process of the present invention may however be used in low temperature formations without additional heating if sufficient time is allowed for the carbonate deposition to occur. Deposition can proceed at temperatures as low as room temperature (about 20° C.) or even lower.

In some situations where the process of the present invention is operated, it may be advantageous to increase the rate at which the process proceeds and deposits a mineral as a consolidant by increasing the temperature of the treatment fluid in the formation adjacent to a wellbore. This may be achieved by supplying heat via the wellbore. Methods of supplying heat include, but are not limited to, injection or circulation of hot water, steam or hydrocarbons through the wellbore, or carrying out exothermic chemical reactions in or adjacent to the wellbore. Suitable methods of providing heat to the wellbore and adjacent formation will be well known to those skilled in the art.

The aim of the process of the present invention is to consolidate the formation to a sufficient extent to provide sand control and minimise or remove the need for mechanical sand control. The process will increase the unconfined compressive strength of the formation. As a consequence of the deposition of consolidating material, the permeability of the formation may be reduced to at least some extent. The process is normally applied to formations from which it is intended to produce hydrocarbons or water, or to inject hydrocarbons or water, and therefore it is desirable that the formation retains at least sufficient permeability for production or injection to take place. It will be understood by those skilled in the art that deposition of sufficient consolidant in the formation to reduce the permeability to the point at which production or injection could be sealed off could also have oilfield, water well or other applications for treating underground formations. These may include, but not be limited to, water or gas shut off or the grouting of tunnels. Accordingly, another embodiment of the present invention is to seal off the formation to prevent production or injection. It will be understood that more than one treatment may need to be applied to the formation in order to achieve this or it may be necessary to continuously inject treatment fluid over a prolonged period of time.

To assist the deposition of carbonate onto formation rock, gravel, propant or other surfaces, a water wetting agent may be introduced into the underground formation prior to or at the same time as introducing the treatment fluid into the underground formation.

As normally applied, a relatively slow rate of deposition of consolidating material is generally to be preferred as this will facilitate placement of the treatment fluid deep into the formation before any consolidating material is deposited. Deposition is also more likely to deposit carbonate mineral on internal surfaces rather than result in the precipitation of discrete particles into the bulk fluid. The former will strengthen the formation, whereas the latter will generally result in permeability reduction due to mechanisms such the blocking of pore throats. Thus, in consolidation embodiments carbonate mineral is typically allowed to be deposited from the fluid over a period of from 1 to 28 days, or from 4 to 28 days, such as from 2 to 14 days. In shut-off applications, carbonate mineral may typically be deposited over a period of minutes to several days, such as from 1 hour to 4 days. Deposition time will obviously be a function of the specific system, temperature, concentration etc.

Using an adequately mixed treatment fluid, deposition of the consolidating material will take place homogeneously throughout the treatment fluid and therefore throughout the region of the formation into which the treatment fluid has been placed. This should result in uniform consolidation of the formation.

The consolidation treatment may be applied to any poorly consolidated formation with which an individual treatment fluid is compatible. In addition to poorly consolidated sands or sandstones, it will be apparent to those skilled in the art that the process may also be applied to other poorly consolidated zones or formations such as unconsolidated clays, shale or the like. Wells drilled into the consolidated formation may be used for the production or injection of hydrocarbons or water.

In some embodiments, the process of the present invention may be used to consolidate the formation behind induced or natural fracture faces or proppant within propped fractures.

The process may also be used to deposit material on surfaces other than sand, sandstone, clays, shale etc. present in the formation. In particular, it may also be used to deposit carbonate mineral in frac packs, gravel packs, propped fractures, or the like for the purposes of consolidation of the gravel, proppant or the like. The process may be used for remedial treatments of resin coated gravel or proppant in gravel packs or propped fractures etc where the resin coatings have failed or been removed by other chemical treatments.

The deposition of consolidating material in the formation increases the amount of cementation or adhesion between the sand grains within the sandstone. Deposition is favoured at surfaces and at the contact points between sand grains due to surface energy considerations. Deposition of consolidant on the existing cementation on sand grains that are already cemented together will lead to strengthening of the formation.

Optionally, the treatment fluid may further comprise one or more other components if this assists in the deposition of the consolidating carbonate.

The presence of suitable nucleating materials may also assist in ensuring deposition takes place on the existing cementation. Such materials may be incorporated into the treatment fluid or introduced into the formation ahead of the treatment fluid.

Suitable nucleating materials will be any material that preferentially binds or associates to the particles or cementation already present in the formation, and which acts as a nucleating material for consolidants of the present invention. Suitable nucleating materials include, but are not limited to, polymers such as polysaccharides and proteins and microparticles (micro-crystals) of the consolidant being deposited. Suitable effective materials will be known to those skilled in the art. The effectiveness of different materials will be readily determinable by suitable tests. Organic-inorganic (carbonate) composites may be stronger that just carbonate alone (Rodriguez-Navarro, C. Et al. (2003). Conservation of Ornamental Stone by *Myxococcus xanthus*—Induced Carbonate Biomineralization. Applied and Environmental Microbiology, Vol. 69 No 4 pp 2182-2193).

The use of polymers in or with the treatment fluid of the present invention may therefore be advantageous as it may result in the deposition of a consolidant stronger that the carbonate mineral in isolation.

Where the consolidant that is deposited is essentially the same mineral as the existing cementation or nucleating material, deposition onto the existing cementation will be particularly favoured. For example, where calcium carbonate is deposited as a consolidant, the presence of existing calcium carbonate in the cementation is expected to provide an excellent surface for nucleation and deposition of the new calcium carbonate.

In some situations, it may be useful to incorporate materials that have the opposite effect to nucleating agents, i.e. act as delaying agents which inhibit, modify or regulate the deposition of the consolidating material to at least some extent. These may be any materials that prevent, slow, modify or inhibit deposition of the consolidating mineral at the concentration at which they are used.

Particularly useful will be scale inhibitors, such as will be known to those skilled in the art and which are generally used to prevent deposition of oilfield scales. Oil field scale inhibitors include phosphate esters, phosphonates, sulfonates, and polyacrylates. Other scale inhibitors include copolymers and terpolymers of acrylates, sulfonates and phosphonates, phosphinico polycarboxylic acids (PPCA) and mixtures thereof. Particularly useful scale inhibitors include 2-hydroxyethyl imino bis methylene phosphonic acid, fatty amine phosphonates, triethanolamine phosphate ester, DETA phosphonate (pentaphosphonates) and TETA phosphonate (hexaphosphonates). Other examples of suitable scale inhibitors include diethylenetriamine penta(methylene)phosphonic acid, DETPMP), polyphosphino-carboxylic acids (PPCAs) and polymers such as polyacrylate (PAA) and poly vinyl sulphonate (PVS), sulphonated polyacrylates (VS-Co), phosphonomethylated polyamines (PMPA) and combinations thereof.

Many known scale inhibitors are proprietary chemicals are generally composed of materials which fall into one of three chemical classes: (1) low molecular weight polycarboxylates, including polyacrylates and polymaleates; (2) inorganic polyphosphates and phosphate esters; and (3) phosphonates. Each class has properties which make certain materials desirable depending on the specific conditions.

Introduction of such materials into the formation ahead of, or contained in the treatment fluid, may retard deposition of consolidant and allow consolidation deeper into the formation. In the case of scale inhibitors, dilution of the scale inhibitor to below the minimum inhibitory concentration (MIC) will generally be needed in order for mineral deposition to occur.

It will be understood by those skilled in the art that the morphology of any carbonate crystals deposited can be influenced by the type of surface on which they grow and also by the type and concentration of the chemicals present in the treatment fluid. The morphology of the carbonate crystals deposited may not be important, as long as consolidation proceeds to the desired extent. Methods of adjusting the morphology of carbonate crystals by addition of chemicals is well established and therefore a skilled person could, if desired, routinely seek to obtain carbonate crystals in a particular morphology by judicious choice of additional chemicals in the treatment fluid.

In general, use of treatment formulations that deposit consolidant at a relatively slow rate is preferred as this is more likely to result in effective consolidation. Effective consolidation may reduce the permeability of the formation to some extent but this is an acceptable trade-off if the treatment results in strengthening of the formation. It is noteworthy in the process of the present invention that deposition is very slow. Despite rather low yields of consolidant compared to other systems, good consolidation is obtained.

Deposition of consolidant from the treatment fluid at too rapid a rate may result in the deposition of discrete carbonate particles in the treatment fluid, which could potentially block pore throats and substantially reduce the permeability of the formation but without giving the same degree of strengthening obtained from a slower deposition at surfaces. It will be understood by those skilled in the art that the deposition of material for blocking of pore throats or sealing off of the formation is potentially useful and capable of industrial application. Operation of the process in such a manner may therefore result in blocking of pore throats leading to sealing off of the formation to production or injection.

The deposition of mineral onto the sand grains or other internal surfaces of the underground formation increases the amount of cementing materials and will generally increase the unconfined compressive strength of the formation. Following consolidation of the formation, wells penetrating the formation may if desired be put on production or injection.

The deposited carbonate will normally have a low solubility in water so that during production or injection the consolidant is not dissolved by water leading to a reduction in the amount of consolidant and a reduction in the strength of the formation with time. If dissolution of the consolidant occurs at a higher than desirable rate, as determined by laboratory or field determinations, re-consolidation of the formation using more treatment fluid may be required.

Normally, all substances used in the process of the present invention will be technical or agricultural feed grade to reduce the cost of the process.

Suitable concentrations of substances used in the process of the present invention will depend on the required amount of consolidant to be deposited in the formation. This will depend on the particular combination of substances chosen. Typical concentrations of component (I) include from 1 to 25% w/v measured in terms of the weight of a salt comprising the cations and in which form the cations have been supplied to the treatment fluid). Suitable such concentrations of component (I) include from 1 to 20% w/v and from 3 to 15% w/v, such as about 5% w/v or about 10% w/v. Typical concentrations of component (II) include from 1 to 25% w/v. Suitable such concentrations of component (II) include from 1 to 20% w/v and from 3 to 15% w/v, such as about 2% w/v or about 10% w/v. Typical concentrations of components (III)(a), (III)(b), (IV), (V), (VI) and (VII) range from about 0.2% w/v to 10% w/v.

The concentrations used will also depend on the solubility of the components in the treatment fluid. Consolidant yield will typically be of the order of 0.2 to 100 grams per liter of treatment fluid (preferably 1 to 50 grams per liter) although higher or lower concentrations may be appropriate in some situations.

Any nucleating materials or scaling modifiers regulators or inhibitors will be used at a suitable concentration to give the desired effect and suitable concentrations will be understood by those skilled in the art or may be readily determined by suitable laboratory evaluations.

Some mixing of reservoir fluids and treatment fluid will occur in the formation. Possible dilution of the concentration of the chemical species in the treatment is therefore expected to occur and the initial concentration of these chemical species may be increased to compensate for the expected dilution. However, in many cases the formation water or formation rock will contain appreciable concentrations of a chemical species that may be useful in the process of the present invention and this will also be taken into account by persons designing the treatments and skilled in the art. For example, there is frequently a high concentration of soluble calcium in many formation waters.

More than one type of (I) cations of a metal having an oxidation state of +2, and more than one source of (II) amino acid having at least one deprotonated carboxylic acid group (or substance capable of generating an amino acid having at least one deprotonated carboxylic acid group in situ), may be used in the treatment fluid, which may lead to the deposition of more than one type of carbonate mineral in the formation.

Similarly, more than one type of (I) cations of a metal having an oxidation state of +2, and more than one source of: (III) (a) ammonia or an amine; and (b) at least one of (i) an alpha oxocarboxylic acid that contains a functional group of the formula —C(=O)—C(=O)—O$^-$, (ii) an alkylene carbonate and (iii) a beta oxocarboxylic acid ester; (IV) an amino alkyl sulphonic acid having at least one deprotonated sulphonic acid group; (V) an alpha ketocarboxylic acid that contains a functional group of the formula —C(=O)—C(=O)—O$^-$; (VI) a beta oxocarboxylic acid ester; and (VII) an alkylene carbonate; may be used in the treatment fluid, which may lead to the deposition of more than one type of carbonate mineral in the formation.

The process of the present invention may be applied to any well drilled into an underground formation but is particularly intended for use in poorly consolidated formations. Types of well may include vertical, deviated, inclined or horizontal wells. The wells may be cased and perforated, openhole, or completed using any other type of completion.

The process of the present invention may, if desired, be used in conjunction with mechanical and/or other chemical methods of sand control such as will be known to those skilled in the art. The process may be used before, after or at the same time as the other methods of sand control as is appropriate for the particular case.

Where a formation is sensitive to, and may be damaged by introduced fluids this will generally be taken into account in formulating treatment fluids of the present invention. For example, where clay swelling is a problem, suitable inhibitors may be incorporated in the fluid to inhibit the swelling. These may include chelating agents or other chemicals such as $CaCl_2$ and $AlCl_3$. Such inhibitors may be incorporated into the treatment formulation, if compatible with the other components in the treatment formulation and still allowing consolidation to occur.

The process as generally operated involves the deposition of consolidant from an aqueous solution onto a water-wet surface. It may therefore be beneficial to treat the formation ahead of a treatment with any agents that are commonly used to remove hydrocarbons from the formation surfaces in the zone of the formation to be consolidated, leaving a water-wet surface. Agents that can achieve this include, but are not limited to, solvents, mutual solvents and surfactants including hydrocarbon microemulsifying surfactants. Suitable agents may also be incorporated into the treatment fluid if compatible, for example where an emulsion or microemulsion treatment fluid is used. The use of microemulsions may be particularly beneficial in cleaning and water wetting surfaces. Other additives that may be useful in the process of the present invention include viscosity modifying agents and fines suspenders but any other additives that are recognised as providing a benefit to the treatment by those skilled in the art may also be used. Such additives or chemicals may be introduced ahead of the treatment fluid, incorporated into the treatment fluid, or used after the treatment fluid as long as they are compatible with the consolidation process.

In a preferred aspect of the present invention, the treatment fluid further comprises one or more additional components, such as a water-wetting agent, a clay swelling inhibitor, a nucleating material or a delaying agent.

Consolidants that are particularly usefully deposited using the process of the present invention include carbonates of the type that are typically already present as cementing material in sandstone formations (for example calcium carbonate or calcium magnesium carbonate). Such minerals are low solubility and will dissolve from the formation at a negligible or acceptably low rate during injection or production operations.

In another embodiment of the present invention, an enzyme or any other catalyst capable of accelerating the deposition of the carbonate from the treatment fluid is also included in the treatment fluid. An advantage of incorporating an enzyme or other catalyst into the treatment fluid in this manner is that the process of the invention can be carried out without the need for an increase in temperature in the treatment fluid once it is in the underground formation. This embodiment of the invention is therefore particularly useful in applications where the underground formation is not at a significantly higher temperature than the ambient temperature outside the wellbore, and/or where it is inconvenient or otherwise undesirable to heat up the treatment fluid when it has been introduced into the formation. One specific application in which this embodiment of the invention may be useful is in grouting applications in tunnels conducted at ambient temperature.

In one preferred aspect of the present invention, the catalyst is a copper salt, for example a copper (II) salt, e.g. copper chloride dihydrate. In another preferred aspect of the present invention, the catalyst is an enzyme.

In a further embodiment, treatment fluids of the present invention may optionally contain an oxidising agent if its presence will increase the rate of deposition of carbonate.

Suitable oxidizing agents may include but not be limited to, hydrogen peroxide, urea hydrogen peroxide, sodium perborate, sodium hypochlorite, sodium bromate, ozone or an organic peroxide such as tert-butyl hydroperoxide.

For example an alpha-oxocarboxylic acid can be produced in situ via the oxidation of an alpha-hydroxy carboxylic acid i.e. oxidation of glycolic acid to glyoxylic acid and oxidation of lactic acid to pyruvic acid. Oxidation can be achieved either with a suitable oxidising agent or an oxidase enzyme.

In a further aspect of the invention as described above, the treatment fluid may optionally be used as a drilling fluid (or drilling mud or drill-in fluid) that can achieve consolidation during or following drilling. In such an embodiment it is necessary that the treatment fluid will also fulfil the requirements of a drilling fluid.

Required functions of a drilling fluid include: control of formation pressure; lubrication of the drill string; cooling of the drill bit; suspension of solids under static and dynamic conditions and the removal of drilled cuttings from the hole. The term drilling should be taken to include under-reaming and similar operations.

In this further embodiment of the present invention components (i) and (ii) of the treatment fluid will enter the formation during drilling as part of the fluid spurt loss that occurs as a filter cake is deposited on the inside of the wellbore. A drilling fluid is normally formulated to minimise the loss of fluid to the formation, by incorporating particulate materials into the fluid which, in combination with fines generated during the drilling process and viscosifying polymers (if present) contribute to the build up of a filter cake. Fluid spurt loss is the loss of fluid to the formation that takes place as the filter cake builds up.

However, in the case of the present invention it is generally advantageous to formulate the treatment fluid used as a drilling fluid to give a larger spurt loss than is normally obtained and therefore to obtain consolidation around the wellbore to a greater depth than would otherwise be the case. Accordingly, it will generally be desirable not to incorporate particulate materials into treatment fluids used as drilling fluids in the present invention, or alternatively to use only low concentrations of particulate materials or particles of such a size that a larger spurt loss occurs than is generally the case for standard drilling fluids.

High loadings of particulate materials are intended to reduce the spurt loss and low or zero loadings will increase the spurt loss. Filtrate is estimated to penetrate into the formation to depths of 30 to 60 cm even in the case of normally formulated drilling muds, although the penetration of particulates is generally much less than this. With drilling fluids formulated to give high spurt losses deeper penetration will generally occur. After deposition of the filter cake, some further fluid loss to the formation may occur, but this is likely to be limited.

The treatment fluid used as a drilling fluid will be prepared at the surface, generally in the mud pits, by any method which would be known to those skilled in the art. If the rate of carbonate deposition is slow enough components (I) and (II), (III), (IV), (V), (VI) or (VII) may be incorporated directly into the treatment fluid used as a drilling fluid. Alternatively if the rate of deposition of carbonate mineral is fast enough to result in unacceptable levels of the consolidating material being deposited in the bulk drilling fluid, one or more of these substances may be introduced and mixed into the drilling fluid lower down the drilling assembly, so that more of the consolidating material is produced in the formation after spurt loss has taken place. Introduction and mixing into the drilling fluid lower down the drilling assembly may be achieved by any method that is known to those skilled in the art. It may also be preferable in this embodiment to make use of a component that is generated in-situ in the treatment fluid from another substance (e.g., use as component (II) of a substance capable of generating an amino acid having at least one deprotonated carboxylic acid group in situ) and/or a treatment fluid which only becomes alkaline in situ, since these will also generally delay the onset of consolidation.

During drilling, using treatment fluids formulated as drilling fluids according to the process of the present invention, it will generally be desirable to monitor the composition of the treatment fluid to measure the concentrations of the chemical substance(s) (I)-(VII) (e.g., (I) and (II)) and any nucleation material(s) or delaying substances incorporated into the treatment fluid. After formulating a treatment fluid as a drilling fluid and during drilling, some consolidant may be deposited within the drilling fluid. Any solid materials produced within the bulk treatment fluid during drilling will remain as part of the drilling fluid or be deposited as part of the filter cake. Deposition of consolidant in the treatment fluid will reduce the concentration of those consolidant forming chemicals within the bulk treatment fluid and therefore their concentration in the fluid spurt loss. The monitoring of individual chemicals in the bulk treatment fluid will indicate what chemicals might need to have their concentration increased (or where the pH is important in achieving consolidation what pH adjustment may be needed) in order to maintain the effectiveness of the treatment fluid that will deposit the required amount of consolidant in the formation. Methods of monitoring and replacement of chemicals consumed in the reaction will be such methods as are generally well known to those skilled in the art.

For the avoidance of doubt, it is emphasised that the treatment fluid of the present invention is as defined in relation to the process of the present invention. Therefore preferred features of the treatment fluids as referred to in relation to the process of the present invention (e.g., in relation to the identity of components (I)-(VII), the alkaline characteristics of the fluid, the solvent(s) and also optional components of the fluid) apply equally to the treatment fluids of the present invention. Furthermore, typically in the use of the present invention, the treatment fluid is as described in respect of the process of the present invention. Therefore preferred features of the treatment fluid as referred to in relation to the process of the present invention apply equally to the treatment fluid in the use of the present invention.

The skilled person would appreciate that the process for consolidating an underground formation of the present invention can also be applied in other applications where deposition of carbonate material from a fluid may be desirable. For example, coating or impregnating objects such as building stonework and statues with carbonate material may sometimes be desirable for preservation and/or strengthening purposes. The present invention therefore extends to a process for depositing carbonate material from a fluid. Typically the deposition occurs onto a surface that is in contact with the treatment fluid. For example, an object having the surface to be modified may be submerged in the treatment fluid. The treatment fluid itself is as defined in the context of the process for consolidating an underground formation. The deposition process also proceeds in a directly analogous manner to that in the process for consolidating an underground formation.

The present invention has the numerous advantages. It provides novel processes based on generally cheap, readily available components that are easy to store, transport and mix and are generally low hazard, low toxicity and environmentally acceptable. The processes are easy to apply and may be applied to new wells or to wells that have already been produced in order to strengthen the formation or frac packs, gravel packs, propped fractures or the like and reduce or prevent sand or fines production.

The processes may also be used for remedial treatments of previously consolidated gravel or proppant packs where consolidation was incomplete or has failed. In some embodiments the process can be used to strengthen the formation during or following drilling, through use of the treatment fluid as a drilling fluid. The process may be readily applied to long formation intervals. The processes may be used in cased and perforated or openhole wells. The process can achieve effective consolidation while retaining useful levels of permeability.

In other embodiments the invention may be used to substantially reduce the permeability, even to the point of shutting off production or injection. The process may also be used for other underground applications such as grouting of tunnels. Other applications that will be apparent to those skilled in the art include; ground consolidation in areas of poor soil consolidation; strengthening of embankments, dykes, dams or artificial islands; consolidating shore lines or cliff faces for combating coastal erosion; strengthening of, and/or filling cracks in, brickwork, plaster, building foundations, concrete or road surfaces; setting of foundry moulds; sealing fractures in pipelines; restoring and/or conserving stone monuments, art, statuary or objects; increasing the speed at which concrete, grout and/or plaster sets; or incorporating carbonate mineral into composite materials. Other potential applications include depositing a protective layer of $CaCO_3$ on to clay or shale surfaces to act as a clay or shale swelling inhibitors or the deposition of protective surfaces on internal pipe work.

Another advantage of the present invention is that the carbonate consolidants may be readily removed by simple acidizing if required (either partly or wholly) if for example permeability reduction is more than considered desirable. This is in marked contrast to the situation where resins have been used for consolidation as they are generally very difficult to remove.

The invention is further illustrated in the following examples. Examples 1 to 12 relate to processes based on (I) and (II). Tables 1 and 2 relates to processes based on (I) and (II), (III), (IV), (V), (VI) or (VII).

EXAMPLE 1

Deposition of Calcium Carbonate

A treatment fluid comprising deionised water containing 10% w/v sodium glycinate (glycine sodium salt hydrate) and 10% w/v calcium chloride dihydrate was prepared and placed in stoppered pyrex boiling tubes. The initial pH, measured at room temperature was 10.54. On heating to 60° C., a white precipitate was slowly deposited on the internal surface of the glass tube (that part of the tube in contact with the treatment fluid) over a period of 3 days. The precipitate was collected, washed and identified as calcium carbonate using FT-IR analysis. Addition of 4M hydrochloric acid to the white precipitate resulted in evolution of gas. The same treatment fluid maintained at ambient temperature (approximately 20° C.) also deposited calcium carbonate but at a much slower rate (at least 10 days).

EXAMPLE 2

Deposition of Calcium Carbonate

A treatment fluid comprising deionised water containing 10% w/v L-histidine with a stoichiometric amount of sodium hydroxide and 10% w/v calcium chloride dihydrate was prepared and placed in stoppered pyrex boiling tubes. On heating to 60° C., a white precipitate was slowly deposited on the internal surface of the glass tube (that part of the tube in contact with the treatment fluid) over a period of 3 days. The precipitate was collected, washed and identified as calcium carbonate using FT-IR analysis. Addition of 4M hydrochloric acid to the white precipitate resulted in evolution of gas.

EXAMPLE 3

Deposition of Calcium Carbonate

A treatment fluid comprising deionised water containing 10% w/v β-alanine with a stoichiometric amount of sodium hydroxide and 10% w/v calcium chloride dihydrate was prepared and placed in stoppered pyrex boiling tubes. On heating to 60° C., a white precipitate was slowly deposited on the internal surface of the glass tube (that part of the tube in contact with the treatment fluid) over a period of 3 days. The precipitate was collected, washed and identified as calcium carbonate using FT-IR analysis. Addition of 4M hydrochloric acid to the white precipitate resulted in evolution of gas.

EXAMPLE 4

Deposition of Calcium Carbonate

A treatment fluid comprising deionised water containing 10% w/v L-alanine with a stoichiometric amount of sodium hydroxide and 10% w/v calcium chloride dihydrate was prepared and placed in stoppered pyrex boiling tubes. On heating to 60° C., a white precipitate was slowly deposited on the internal surface of the glass tube (that part of the tube in contact with the treatment fluid) over a period of 3 days. The precipitate was collected, washed and identified as calcium carbonate using FT-IR analysis. Addition of 4M hydrochloric acid to the white precipitate resulted in evolution of gas.

EXAMPLE 5

Deposition of Calcium Carbonate

A treatment fluid comprising deionised water containing 10% w/v DL-serine with a stoichiometric amount of sodium hydroxide and 10% w/v calcium chloride dihydrate was prepared and placed in stoppered pyrex boiling tubes. On heating to 60° C., a white precipitate was slowly deposited on the internal surface of the glass tube (that part of the tube in contact with the treatment fluid) over a period of 3 days. The precipitate was collected, washed and identified as calcium carbonate using FT-IR analysis. Addition of 4M hydrochloric acid to the white precipitate resulted in evolution of gas.

EXAMPLE 6

Deposition of Calcium Carbonate

A treatment fluid comprising deionised water containing 10% w/v L-glutamic acid with a stoichiometric amount of sodium hydroxide (2 equivalents) and 10% w/v calcium chloride dihydrate was prepared and placed in stoppered pyrex boiling tubes. On heating to 60° C., a white precipitate was slowly deposited on the internal surface of the glass tube (that part of the tube in contact with the treatment fluid) over a period of 3 days. The precipitate was collected, washed and identified as calcium carbonate using FT-IR analysis. Addition of 4M hydrochloric acid to the white precipitate resulted in evolution of gas.

EXAMPLE 7

Deposition of Calcium Carbonate

A treatment fluid comprising deionised water containing 10% w/v L-aspartic acid with a stoichiometric amount of sodium hydroxide (2 equivalents) and 10% w/v calcium chloride dihydrate was prepared and placed in stoppered pyrex boiling tubes. On heating to 80° C., a white precipitate was slowly deposited on the internal surface of the glass tube (that part of the tube in contact with the treatment fluid) over a period of 100 hours. The precipitate was collected, washed and identified as calcium carbonate using FT-IR analysis. Addition of 4M hydrochloric acid to the white precipitate resulted in evolution of gas.

EXAMPLE 8

Consolidation of Glass Beads

An uncoloured, clear and transparent treatment fluid comprising deionised water containing 10% w/v sodium glycinate (glycine sodium salt hydrate) and 10% w/v calcium chloride dihydrate was prepared and introduced into an Ofite double ended HPHT cell assembly (Cat No. 170-46) containing a ceramic disc (2.5×0.25", 10 micron, 2 Darcy permeability) and 60 ml bed volume of glass beads of diameter 200 to 300 micron so that the beads were submerged in approximately 90 ml of the treatment fluid. The initial pH, measured at room temperature was 10.54. The beads and treatment fluid were stirred to remove any air bubbles. Before adding the beads and treatment fluid the inside of an Ofite HPHT cell was lined with a thin coating of silicon grease, then a thin sheet of PTFE, to prevent the glass beads sticking to the stainless steel internal surface of the cell and allow recovery of any consolidated material. The top was placed on the HPHT cell. The bottom valve, initially closed, was opened to allow 20 ml of treatment fluid to pass through the bottom valve dropwise. The top and bottom valves were both closed and the HPHT cell heated to 60° C. After 11 days, both valves on the HPHT cell were opened and clear, spent treatment fluid freely drained from the cell, indicating that permeability was retained within both the beads and the ceramic disc. Both ends were removed. The ceramic disc was also removed. The bed of glass beads was found to have been effectively consolidated. The consolidated beads were removed from the HPHT cell as a single large cylindrical block using a plunger comprised of a steel tube and a plastic disc. Addition of 4M hydrochloric acid to the consolidated beads resulted in evolution of gas and the beads fell apart.

EXAMPLE 9

Consolidation of Glass Beads

An uncoloured, clear and transparent treatment fluid comprising deionised water containing 10% w/v glycine plus a stoichiometric amount of sodium hydroxide and 10% w/v calcium chloride dihydrate was prepared and introduced into an Ofite double ended HPHT cell assembly (Cat No. 170-46) containing a ceramic disc (2.5×0.25", 10 micron, 2 Darcy permeability) and 60 ml bed volume of glass beads of diameter 200 to 300 micron so that the beads were submerged in approximately 90 ml of the treatment fluid. The beads and treatment fluid were stirred to remove any air bubbles. Before adding the beads and treatment fluid the inside of an Ofite HPHT cell was lined with a thin coating of silicon grease, then a thin sheet of PTFE, to prevent the glass beads sticking to the stainless steel internal surface of the cell and allow recovery of any consolidated material. The top was placed on the HPHT cell. The bottom valve, initially closed, was opened to allow 20 ml of treatment fluid to pass through the bottom valve. The top and bottom valves were both closed and the HPHT cell heated to 60° C. After 14 days, both valves on the HPHT cell were opened and clear, spent treatment fluid freely drained from the cell, indicating that permeability was retained within both the beads and the ceramic disc. Both ends were removed. The ceramic disc was also removed. The bed of glass beads was found to have been effectively consolidated. The consolidated beads were removed from the HPHT cell as a single large cylindrical block using a plunger comprised of a steel tube and a plastic disc. Addition of 4M hydrochloric acid to the consolidated beads resulted in evolution of gas and the beads fell apart.

EXAMPLE 10

Consolidation of Glass Beads

An uncoloured, clear and transparent treatment fluid comprising deionised water containing 5% w/v glycine plus a stoichiometric amount of sodium hydroxide and 10% w/v calcium chloride dihydrate was prepared and introduced into an Ofite double ended HPHT cell assembly (Cat No. 170-46) containing a ceramic disc (2.5×0.25", 10 micron, 2 Darcy permeability) and 60 ml bed volume of glass beads of diameter 200 to 300 micron so that the beads were submerged in approximately 90 ml of the treatment fluid. The initial pH, measured at room temperature was 10.54. The beads and treatment fluid were stirred to remove any air bubbles. Before adding the beads and treatment fluid the inside of an Ofite HPHT cell was lined with a thin coating of silicon grease, then a thin sheet of PTFE, to prevent the glass beads sticking to the stainless steel internal surface of the cell and allow recovery of any consolidated material. The top was placed on the HPHT cell. The bottom valve, initially closed, was opened to allow 20 ml of treatment fluid to pass through the bottom valve. The top and bottom valves were both closed and the HPHT cell heated to 60° C. After 14 days, both valves on the HPHT cell were opened and clear, spent treatment fluid freely drained from the cell, indicating that permeability was retained within both the beads and the ceramic disc. Both ends were removed. The ceramic disc was also removed. The bed of glass beads was found to have been effectively consolidated. The consolidated beads were removed from the HPHT cell as a single large cylindrical block using a plunger comprised of a steel tube and a plastic disc. Addition of 4M hydrochloric acid to the consolidated beads resulted in evolution of gas and the beads fell apart.

EXAMPLE 11

Yield of Consolidant

The dry weight yield of consolidant was estimated using large stoppered pyrex boiling tubes containing reaction mixtures incubated at either 60° C. or 80° C. for up to 528 hours (22 days). The yield at 528 hours was as follows.

| Formulation | Temp ° C. | Yield g/l at 528 hours |
|---|---|---|
| 5% w/v $CaCl_2 \cdot 2H_2O$ + 5% w/v Glycine sodium salt hydrate | 60 | 1.75 |
| 5% w/v $CaCl_2 \cdot 2H_2O$ + 5% w/v Glycine sodium salt hydrate | 80 | 3.65 |
| 5% w/v $CaCl_2 \cdot 2H_2O$ + 10% w/v Glycine sodium salt hydrate | 60 | 2.6 |
| 5% w/v $CaCl_2 \cdot 2H_2O$ + 10% w/v Glycine sodium salt hydrate | 80 | 4.5 |

It should be noted that at the point the experiment was terminated (528 hours), increases in yield were still being observed i.e. the reaction had not gone to completion.

EXAMPLE 12

Effect of Copper Chloride on Yield of Consolidant

The effect of including copper (II)chloride ($CuCl_2$) at 51.5 mM in a 5% w/v $CaCl_2.2H_2O$+10% w/v Glycine sodium salt hydrate formulation was investigated. The yield after 66 hours at 60° C. was 4.10 g against 1.55 g in a control without copper.

The above examples are for illustration only and are not for the purpose of limiting the scope of the present invention. It will be understood by those skilled in the art that other salts, other concentrations, other shut-in periods and other temperatures may also result in useful levels of consolidation.

TABLE 1

Summary of reagent combinations observed to result in calcium carbonate deposition.

| Reagent 1 | Reagent 2 |
|---|---|
| 3-Amino butyric acid | N/A |
| 2-Amino-2-(hydroxymethyl)-1,3-propanediol | GLYX, EAA, MAA |
| 2-Oxobutyric acid | N/A |
| Acetone oxime | GLYX |
| Ammonia | GLYX |
| Beta alanine | N/A, GLYX, EAA, MAA |
| Bis(2-hydroxypropyl)amine | GLYX, EAA |
| Creatine monohydrate | EAA |
| Diethanolamine | GLYX |
| Diethylenetriamine | GLYX, EAA |
| Diglycine | N/A |
| DL-Methionine | N/A |
| DL-Serine | N/A, EAA, MCPTL |
| DL-Valine | N/A, EAA, MCPTL |

TABLE 1-continued

Summary of reagent combinations observed to result in calcium carbonate deposition.

| Reagent 1 | Reagent 2 |
|---|---|
| Ethanolamine | N/A, GLYX, EAA*, MAA*, PC* |
| Formamidine acetate | GLYX, EAA |
| Gamma aminobutyric acid | N/A |
| Glycine | N/A, PYRV, GLYX, 4-HBA, PDA, MAA*, EAA*, SDIA, GL, FR, RB, ML, DX, MCPTL, HA, 1,3-DHAD, PC*, EC*, BC*, GC*, HP, UHP, PYRVLD, IVALD |
| Glycine anhydride | N/A |
| Guanidine hydrochloride | GLYX |
| Iminodiacetic acid | N/A, GLYX, SDIA, PC, EAA |
| L-Alanine | N/A, EAA, GLYX |
| L-Arginine | N/A, GLYX, EAA, MCPTL |
| L-Aspartic acid | N/A |
| L-Glutamic acid | N/A, GLYX, EAA |
| L-Histidine | N/A |
| L-Lysine | N/A, GLYX, MCPTL, EAA |
| L-Threonine | N/A, GLYX |
| N-methylethanolamine | EAA, MAA, GL, FR |
| Polyethyleneimine | GC, GLYX, MCPTL, GL, SDIA, EAA, MAA |
| Polyethyleneimine acetic acid sodium salt | GLYX |
| Potassium formate | EAA, MAA |
| Pyruvic acid | N/A |
| Sarcosine | N/A, GLYX, PC, EAA, MAA, MCPTL, SDIA |
| Sodium acetate | GC, PC, EAA, MAA |
| Taurine | N/A, GLYOX, EAA |
| Triglycine | N/A |
| Urea | GLYX, GC, EAA, MAA, N/A |

The above table shows reagent combinations observed to result in calcium carbonate deposition. All reactions were performed in the presence of enough NaOH to fully deprotonate the reagents. All mixtures contained 5% w/v $CaCl_2.2H_2O$ and were heated at 60° C. in closed vessels. Observations were made over periods of up to 14 days. The concentrations of Reagent 1 and Reagent 2 used in the experiments reported in Table 1 were in the range of 0.2% w/v to 10% w/v. When any of the chemicals listed under reagent 2 are marked with an asterisk * it means that the reaction was also observed to precipitate $CaCO_3$ at room temperature.

Whenever N/A is listed under reagent 2, it means that using reagent 1 without a second reagent was observed to result in the deposition of calcium carbonate.

List of Reagent 2 Abbreviations for Table 1:

| Abbreviation | Chemical name |
|---|---|
| 1,3-DHAD | 1,3-Dihydroxyacetone dimer |
| 4-HBA | 4-Hydoxybenzaldehyde |
| BC | Butylene carbonate |
| DX | Dextrin |
| EAA | Ethylacetoacetate |
| EC | Ethylene carbonate |
| FR | D-(−)-Fructose |
| GC | Glycerine carbonate |
| GL | D-(+)-Glucose |
| GLYX | Glyoxylic acid |
| HA | Hydroxyacetone |
| HP | Hydrogen peroxide |
| IVALD | Isovaleraldehyde |
| MAA | Methylacetoacetate |
| MCPTL | Methyl cyclopentenolone |
| ML | D-(+)-Maltose |
| PC | Propylene carbonate |
| PDA | Phthaldialdehyde |

-continued

| Abbreviation | Chemical name |
|---|---|
| PYRV | Pyruvic acid |
| PYRVLD | Pyruvaldehyde |
| RB | D-(−)-Ribose |
| SDIA | Sodium D-Isoascorbate |
| UHP | Urea hydrogen peroxide |

Table 2 below provides a summary of selected reactions shown to deposit calcium carbonate. The table in particular provides a qualitative assessment of rate and extent of carbonate deposition and scaling and the ability of the scale to consolidate glass beads and sand. All reactions in Table 2 were performed in the presence of 5 g $CaCl_2.2H_2O$ and made up to a total of 100 ml in deionised water. All reactions were subsequently heated in closed vessels at 60° C. for up to 14 days.

TABLE 2

| No | Generic reaction type | Specific example | Formulation used | A | B | C | D | E |
|---|---|---|---|---|---|---|---|---|
| 1 | Amino acid | Glycine | 10 g Glycine + 71.6 ml 2M NaOH sol. | 1 | 1 | 2 | 4-5 | 3-4 |
| 2 | Amino acid | Lysine | 10 g L-Lysine monohydrochloride + 57.49 ml 2M NaOH sol. | 1 | 1 | 2 | 5 | 4 |
| 3 | Amino acid | Glutamic acid | 10 g L-Glutamic acid + 71.37 ml 2M NaOH sol. | 1 | 1 | 2 | 4-5 | 3-4 |
| 4 | N-Alkylamino acid | Sarcosine | 10 g Sarcosine + 60.33 ml 2M NaOH sol. | 1 | 1 | 2 | 4-5 | 3-4 |
| 5 | Aminoalkyl sulphonic acid | Taurine | 10 g Taurine + 42.95 ml 2M NaOH sol. | 1 | 1 | 2 | 4-5 | n/a |
| 6 | Amino acid + Copper salt | Glycine + Copper chloride dihydrate | 10 g Glycine + 71.6 ml 2M NaOH sol. + 0.17 g $CuCl_2 \cdot 2H_2O$ | 2 | 2 | 2 | n/a | n/a |
| 7 | Secondary alkyl amine + alpha oxocarboxylic acid | Diethanolamine + Glyoxylic acid | 6 g Diethanolamine hydrochloride + 4.48 ml Glyoxylic acid 50% wt. sol. + 41.44 ml 2M NaOH sol. | 2 | 3 | 4 | n/a | 2 |
| 8 | Amino acid + alpha diketone | Glycine + Methyl cyclopentenolone | 2 g Glycine + 14.32 ml 2M NaOH sol. + 2 g Methyl cyclopentenolone | 2 | 3 | 3 | 1 | n/a |
| 9 | Ammonia precursor + alpha oxocarboxylic acid | Urea + Glyoxylic acid | 2 g Urea + 2.99 ml Glyoxylic acid 50% wt. sol. + 13.51 ml 2M NaOH sol. | 2 | 3 | 3 | 1 | n/a |
| 10 | Primary alkyl amine + alpha oxocarboxylic acid | Monoethanolamine + Glyoxylic acid | 6 g Monoethanolamine hydrochloride + 4.48 ml Glyoxylic acid 50% wt. sol. + 51.01 ml 2M NaOH sol. | 2-3 | 3 | 4 | 2 | 2-3 |
| 11 | N-Alkyl amino acid + alpha oxocarboxylic acid | Sarcosine + Glyoxylic acid | 4 g Sarcosine + 2.99 ml Glyoxylic acid 50% wt. sol. + 37.64 ml 2M NaOH sol. | 2-3 | 3 | 4 | 3-4 | 2 |
| 12 | Beta amino acid + alpha oxocarboxylic acid | Beta-alanine + Glyoxylic acid | 2 g Beta-alanine + 2.99 ml Glyoxylic acid 50% wt. sol. + 24.73 ml 2M NaOH sol. | 2-3 | 3 | 4 | 2 | n/a |
| 13 | Amino acid + Beta oxocarboxylic acid ester | Glycine + Ethylacetoacetate | 2 g Glycine + 14.32 ml 2M NaOH sol. + 1.94 ml Ethyl acetoacetate | 2-3 | 3 | 5 | 2 | n/a |
| 14 | Alpha ketocarboxylic acid | Pyruvic acid | 7.89 ml Pyruvic acid + 56.78 ml 2M NaOH sol. | 2-3 | 5 | 3 | n/a | n/a |
| 15 | Aminoacid + Hemiacetal | Glycine + Glucose | 2 g Glycine + 14.32 ml 2M NaOH sol. + 2 g D-(+)-Glucose | 2-3 | 3 | 3 | 2 | n/a |
| 16 | Amino acid + aldehyde | Glycine + 4-Hydroxybenzaldehyde | 2 g Glycine + 14.32 ml 2M NaOH sol. + 2 g 4-Hydroxybenzaldehyde | 2-3 | 3 | 3 | n/a | n/a |
| 17 | Amino acid + Isoascorbate | Glycine + Sodium D-isoascorbate | 2 g Glycine + 14.32 ml 2M NaOH sol. + 2 g Sodium D-isoascorbate | 3 | 3 | 2 | n/a |
| 18 | Primary alkyl amine + Beta oxocarboxylic acid ester | Ethanolamine + Ethylacetoacetate | 2 g Monoethanolamine hydrochloride + 10.25 ml 2M NaOH sol. + 1.94 ml Ethylacetoacetate | 3-4 | 3 | 1 | n/a | n/a |

TABLE 2-continued

| No | Generic reaction type | Specific example | Formulation used | A | B | C | D | E |
|---|---|---|---|---|---|---|---|---|
| 19 | Aminoacid + alpha oxocarboxylic acid | Glycine + Glyoxylic acid | 2 g Glycine + 2.99 ml Glyoxylic acid 50% wt. sol. + 27.82 ml 2M NaOH sol. | 3-4 | 4 | 3 | 2 | n/a |
| 20 | Amino acid + Oxidising agent | Glycine + Hydrogen peroxide | 2 g Glycine + 14.32 ml 2M NaOH sol. + 1.77 ml $H_2O_2$ 35% wt. sol. | 3-4 | 5 | 1 | 1 | n/a |
| 21 | N-Alkyl amino acid + Alkylene carbonate | Sarcosine + Propylene carbonate | 4 g Sarcosine + 14.32 ml 2M NaOH sol. + 1.6 ml Propylene carbonate | 3-4 | 4 | 2 | n/a | 2 |
| 22 | Primary alkyl amine + Alkylene carbonate | Ethanolamine + Propylene carbonate | 2 g Monoethanolamine hydrochloride + 10.25 ml 2M NaOH sol. + 1.6 ml Propylene carbonate | 4 | 4 | 1 | n/a | n/a |
| 23 | Amino acid + Alkylene carbonate | Glycine + Propylene carbonate | 2 g Glycine + 14.32 ml 2M NaOH sol. + 1.6 ml Propylene carbonate | 5 | 5 | 1 | n/a | n/a |

Key to Table 2:
n/a = Observation has not been made

| | Criterion scored | Range of score lowest to highest | |
|---|---|---|---|
| Column A | Relative rate of $CaCO_3$ precipitation | 1 = Slowest relative rate of $CaCO_3$ precipitation | 5 = Fastest relative rate of $CaCO_3$ precipitation |
| Column B | Relative yield of $CaCO_3$ precipitate | 1 = Lowest relative yield of $CaCO_3$ | 5 = Highest relative yield of $CaCO_3$ |
| Column C | Relative ability to create a layer of $CaCO_3$ scale on various surfaces including glass and plastic (based on the consistency and thickness of the scale.) | 1 = Worst relative scaling ability | 5 = Best relative scaling ability |
| Column D | Relative ability to consolidate 200-300 μm diameter spherical glass beads (based on the relative unconfined compressive strength of the resultant consolidated mass.) | 1 = Worst relative degree of consolidation | 5 = Best relative degree of consolidation |
| Column E | Relative ability to consolidate various types of natural and artificial sand (based on the relative unconfined compressive strength of the resultant consolidated mass.) | 1 = Worst relative degree of consolidation | 5 = Best relative degree of consolidation |

It will be understood by those skilled in the art that the examples given in Table 1 and Table 2 do not limit the scope of the present invention. There are many other potential combinations of chemicals as defined by the claims. While all of the examples are known to be able to deposit a carbonate mineral (in these examples, calcium carbonate) as shown in Table 2 there is generally an inverse relationship between the rate of deposition and the quality of the consolidation obtained i.e. the best consolidation may be achieved by systems that scale relatively slowly and deposit relatively low quantities of carbonate mineral.

In Table 2 examples 1-5 gave good consolidation over a 2 week period at 60° C. whereas example 23 deposited significant amounts of carbonate within a 10 minute period at room temperature (22° C.). At 60° C. examples 1-5 are suited to consolidation. Examples 18-23 may be more suitable for shut-off applications.

It will be understood by those skilled in the art that these examples indicate the situation prevailing at the test temperature of 60° C. The results obtained at other temperatures or (for example) using different concentrations of reagents may differ. Factors that influence the rate of deposition of carbonate, quantity of carbonate deposited, quality of scaling of surfaces and extent of consolidation of glass beads and sand may include the concentration of individual reagents, the ratio between the reagents, the type of base used to deprotonate the acidic reagents, the type of metal (e.g. calcium) salt, temperature, treatment period, type of substrate being treated and the presence of any additional components such as surfactants, solvents, mutual solvents etc.

It will also be understood by those skilled in the art that the amount of each reagent used and the ratio between reagents in each of the reactions mentioned in the above table do not necessarily represent the optimum formulation to achieve the best possible degree of consolidation or scaling, the highest rate of precipitation or the greatest yield of precipitate. The examples are indicative of preferred reagent combinations which have been observed to precipitate $CaCO_3$ at a range of different rates. Other criteria for selecting preferred reagents include price, availability, stability, toxicity and storage, transport and handling requirements. Most of the relatively slow carbonate depositing systems exhibit a delay before deposition begins, which is advantageous when placing the treatment fluids of the present invention into an underground formation.

The invention claimed is:

1. A process for consolidating an underground formation, which process comprises:
 (a) introducing a treatment fluid into an underground formation, which treatment fluid comprises (I) cations of a metal having an oxidation state of +2 or higher and at least one of the following (II) to (III) which is soluble in the treatment fluid:
  (II) an amino acid having at least one deprotonated carboxylic acid group;
  (III) (a) ammonia or an amine; and (b) at least one of (i) an alpha oxocarboxylic acid that contains a functional group of the formula —C(=O)—C(=O)—O⁻, (ii) an alkylene carbonate and (iii) a beta oxocarboxylic acid ester;
 and which treatment fluid is alkaline or becomes alkaline in situ; and
 (b) allowing carbonate mineral to be deposited from the fluid, thereby consolidating the underground formation.

2. A process according to claim 1, wherein:
said cations of a metal having an oxidation state of +2 or higher are group II metal or transition metal cations; or
said cations of a metal having an oxidation state of +2 or higher are selected from magnesium, calcium, strontium, barium, titanium, vanadium, chromium, manganese, iron, cobalt, nickel, copper, zinc, aluminium, silver and zirconium cations.

3. A process according to claim 1, wherein said cations of a metal are provided in the form of a chloride, bromide, nitrate, propionate, lactate, acetate or formate salt.

4. A process according to claim 1, wherein:
in (II) said amino acid having at least one deprotonated carboxylic acid group does not contain a terminal amide group; or
in (II) said amino acid having at least one deprotonated carboxylic acid group is a deprotonated form of glycine, histidine, β-alanine, alanine, serine, glutamic acid, aspartic acid, threonine, sarcosine, lysine, methionine, arginine, valine, iminodiacetic acid, 3-aminobutanoic acid or gamma aminobutyric acid.

5. A process according to claim 1, wherein said treatment fluid comprises (I) calcium chloride and (II) glycine, glutamic acid, sarcosine or lysine.

6. A process according to claim 1, wherein:
in (III) the amine is a primary or secondary amine that does not contain any terminal amide functional groups; or
in (III) the amine is a primary or secondary amine that does not contain any terminal amide functional groups, wherein the primary or secondary amine is selected from monoethanolamine (MEA), diethanolamine (DEA) diethylenetriamine (DETA), triethylenetramine (TETA), N-methylethanolamine, 2-amino-2-(hydroxymethyl)-1,3-propanediol (Tris), bis(2-hydroxypropyl)amine, 2-amino-2-methyl-1,3-propanediol and polyethyleneimine (PEI).

7. A process according to claim 1, wherein:
in (III) the amine is provided in the form of a salt, which salt releases the amine under alkaline conditions; or
in (III) the amine is provided in the form of a salt, which salt releases the amine under alkaline conditions, and wherein said salt is ethanolamine hydrochloride, Tris-hydrochloride or diethanolamine hydrochloride.

8. A process according to claim 1, wherein the, or each, alpha oxocarboxylic acid (III)(b)(i) present in the treatment fluid is selected from glyoxylic acid, pyruvic acid and 2-ketobutyric acid.

9. A process according to claim 1 wherein said treatment fluid comprises at least the components (I) and (II) and additionally comprises a carbonyl compound that is soluble in the treatment fluid.

10. A process according to claim 9, wherein said carbonyl compound is selected from:
a $C_{1-20}$ aldehyde, a $C_{1-20}$ alpha carbonyl ketone, a $C_{1-20}$ alpha hydroxy ketone, an alpha oxocarboxylic acid, a beta oxocarboxylic acid ester, an alkylene carbonate and a D-isoascorbate salt; or
glyoxylic acid monohydrate, glyoxylic acid 50% wt. aqueous solution, pyruvic acid, 2-ketobutyric acid, 4-hydroxybenzaldehdye, phthaldialdehyde, methyl cyclopentenolone, methyl acetoacetate, ethyl acetoacetate, ethylene carbonate, propylene carbonate, butylene carbonate, glycerine carbonate, sodium D-isoascorbate monohydrate, pyruvaldehyde, 2,2-dimethoxyacetaldehyde and hydroxyacetone.

11. A process according to claim 1 wherein said treatment fluid comprises at least the components (I) and (II) and additionally comprises at least one of (i) a hemiacetal or (ii) a hemiketal.

12. A process according to claim 11, wherein:
the hemiacetal or hemiketal is 1,3-dihydroxyacetone dimer or a reducing sugar comprising a monosaccharide, disaccharide, oligosaccharide or polysaccharide; or
the hemiacetal or hemiketal is a reducing sugar comprising a monosaccharide, disaccharide, oligosaccharide or polysaccharide, wherein the monosaccharide, disaccharide or oligosaccharide is selected from glucose, fructose, galactose, xylose, ribose, arabinose, lyxose, allose, altrose, mannose, gulose, talose, lactulose, lactose, maltose, cellobiose or dextrin.

13. A process according to claim 1 wherein:
at least one of the components (II), (III)(a) or (III)(b)(i) is present and is generated in-situ in the treatment fluid from another substance; or
the component (II) is generated in-situ in the treatment fluid from another substance selected from di-, tri-, tetra-, oligo- or poly-peptides.

14. A process according to claim 1, wherein:
at least one of the components (II) and (III)(b)(i) is present and is prepared by deprotonating the corresponding protonated form of the component with at least a stoichiometric equivalent of base; or
at least one of the components (II) and (III)(b)(i) is present and is prepared by deprotonating the corresponding protonated form of the component with at least a stoichiometric equivalent of sodium or potassium hydroxide.

15. A process according to claim 1, wherein:

consolidation proceeds at the prevailing temperature of the underground formation; or the process comprises supplying heat to the underground formation, thereby accelerating the rate of deposition of carbonate material; or the process comprises introducing a water wetting agent into the underground formation prior to or at the same time as introducing the treatment fluid into the underground formation, and wherein said water wetting agent is a surfactant, a solvent or a mutual solvent; or the strength of the formation is increased by the deposition of said carbonate material; or the permeability of the underground formation is reduced by the deposition of said carbonate material; or rock particles, sand, gravel or proppant are consolidated by the deposition of said carbonate material; or the process comprises substantially sealing off the underground formation to production or injection; or the process comprises a remedial treatment of resin-coated gravel or resin-coated proppant; or the treatment is carried out on (a) a new well or (b) a well that has already been produced or injected; or the process comprises the grouting of tunnels; or the treatment fluid further comprises a catalyst for increasing the rate of deposition of the carbonate mineral; or the treatment fluid further comprises a catalyst for increasing the rate of deposition of the carbonate mineral, wherein the catalyst is a copper salt or an enzyme; or the treatment fluid further comprises an oxidising agent for increasing the rate of deposition of the carbonate mineral; or a viscosity modifier, a fines suspender, a clay swelling inhibitor or a nucleating material is introduced into the formation ahead of or in conjunction with the treatment fluid; or a delaying agent is introduced into the formation ahead of or in conjunction with the treatment fluid, and wherein the delaying agent is a scale inhibitor.

16. A process according to claim 1, which process is for consolidating an underground formation during or following drilling and which process comprises:

drilling a well with the treatment fluid after said step of introducing the treatment fluid into the underground formation, and such that at least a portion of the treatment fluid enters the formation; and allowing carbonate mineral to be deposited, thereby consolidating the underground formation, during or following said drilling.

17. A process for depositing carbonate material from a fluid, which process comprises:

(a) providing a fluid comprising (I) cations of a metal having an oxidation state of +2 or higher and at least one of the following (II) to (III) which is soluble in the treatment fluid:
   (II) an amino acid having at least one deprotonated carboxylic acid group;
   (III) (a) ammonia or an amine; and (b) at least one of (i) an alpha oxocarboxylic acid that contains a functional group of the formula —C(=O)—C(=O)—O$^-$, (ii) an alkylene carbonate and (iii) a beta oxocarboxylic acid ester;

and which treatment fluid is alkaline or is capable of becoming alkaline; and (b) allowing carbonate mineral to be deposited from said fluid, if necessary after said fluid has become alkaline.

18. A process according to claim 17, which is a process for:

substantially sealing off an underground formation to production or injection and which comprises:
   (a2) introducing the fluid provided in (a) into an underground formation; and
   (b) allowing carbonate mineral to be deposited from the fluid, thereby substantially sealing off the underground formation to production or injection; or ground consolidation in areas of poor soil consolidation; or strengthening of embankments, dykes, dams or artificial islands; or consolidating shore lines or cliff faces for combatting coastal erosion; or strengthening of, and/or filling cracks in, brickwork, plaster, building foundations, concrete or road surfaces; or setting of foundry moulds; or sealing fractures in pipelines; or restoring and/or conserving stone monuments, art, statuary or objects; or increasing the speed at which concrete, grout and/or plaster sets; or incorporating carbonate mineral into composite materials.

19. A process according to claim 1, wherein in (II) said amino acid having at least one deprotonated carboxylic acid group is a deprotonated form of glycine, glutamic acid, sarcosine or lysine.

20. A process according to claim 13, wherein the di-, tri-, tetra-, oligo- or poly-peptides is diglycine, triglycine, tetraglycine and polyglycine, polyaspartic acid, cyclic dipeptides, cyclic oligo peptides, esters of amino acids, amides of amino acids and proteins.

21. A process according to claim 15, wherein the surfactant is a microemulsifying surfactant.

* * * * *